(12) United States Patent
Ono

(10) Patent No.: US 9,585,173 B2
(45) Date of Patent: Feb. 28, 2017

(54) COMMUNICATIONS SYSTEM, COMMUNICATIONS METHOD, MOBILE COMMUNICATIONS TERMINAL, AND BASE STATION

(71) Applicant: FUJITSU LIMITED, Kawasaki-shi, Kanagawa (JP)

(72) Inventor: Yoshiyuki Ono, Komae (JP)

(73) Assignee: FUJITSU LIMITED, Kawasaki (JP)

( * ) Notice: Subject to any disclaimer, the term of this patent is extended or adjusted under 35 U.S.C. 154(b) by 311 days.

(21) Appl. No.: 14/488,688

(22) Filed: Sep. 17, 2014

(65) Prior Publication Data
US 2015/0003394 A1 Jan. 1, 2015

Related U.S. Application Data

(63) Continuation of application No. PCT/JP2012/057066, filed on Mar. 19, 2012.

(51) Int. Cl.
*H04W 74/08* (2009.01)
*H04W 72/04* (2009.01)
(Continued)

(52) U.S. Cl.
CPC ....... *H04W 74/0833* (2013.01); *H04W 52/04* (2013.01); *H04W 52/242* (2013.01);
(Continued)

(58) Field of Classification Search
None
See application file for complete search history.

(56) References Cited

U.S. PATENT DOCUMENTS

2002/0025812 A1  2/2002 Ahlstrand et al.
2004/0204101 A1  10/2004 Qiu et al.
(Continued)

FOREIGN PATENT DOCUMENTS

JP   2004-320165   11/2004
JP   2007-124493    5/2007
(Continued)

OTHER PUBLICATIONS

International Preliminary Report on Patentability for corresponding International Patent Application No. PCT/JP2012/057066 issued Oct. 2, 2014 with English translation.
(Continued)

*Primary Examiner* — Chirag Shah
*Assistant Examiner* — Srinivasa Reddivalam

(57) ABSTRACT

A communications system includes a base station; and a mobile communications terminal, where the base station and the mobile communications terminal execute a random access procedure, and perform radio communication. The base station is configured to assign to the mobile communications terminal, in the random access procedure, an identifier that corresponds to preamble information, the base station assigning the identifier based on first correspondence information that indicates a given correspondence relation of the preamble information to be transmitted by the mobile communications terminal and the identifier assigned to mobile communications terminal. The mobile communications terminal is configured to execute the random access procedure with the base station by transmitting to the base station, the preamble information that corresponds to the identifier assigned by the base station.

11 Claims, 18 Drawing Sheets

(51) Int. Cl.
*H04W 52/04* (2009.01)
*H04W 52/24* (2009.01)
*H04W 72/08* (2009.01)
*H04W 8/26* (2009.01)
*H04W 52/36* (2009.01)

(52) U.S. Cl.
CPC ....... *H04W 72/042* (2013.01); *H04W 72/085* (2013.01); *H04W 8/26* (2013.01); *H04W 52/365* (2013.01)

(56) References Cited

U.S. PATENT DOCUMENTS

| | | |
|---|---|---|
| 2008/0070610 A1 | 3/2008 | Nishio |
| 2008/0139214 A1* | 6/2008 | Sun ................. H04W 72/042 455/450 |
| 2009/0238126 A1 | 9/2009 | Sato et al. |
| 2009/0312018 A1* | 12/2009 | Moulsley ............. H04B 7/04 455/435.1 |
| 2009/0316631 A1 | 12/2009 | Kato et al. |
| 2011/0002321 A1 | 1/2011 | Iwai et al. |
| 2011/0099447 A1* | 4/2011 | Park ................. H04L 1/1812 714/748 |
| 2011/0305197 A1* | 12/2011 | Park ................. H04L 1/1812 370/328 |
| 2013/0016701 A1* | 1/2013 | Malladi ............ H04L 1/0029 370/331 |
| 2014/0079011 A1* | 3/2014 | Wiberg ............ H04W 74/006 370/329 |

FOREIGN PATENT DOCUMENTS

| | | |
|---|---|---|
| JP | 2009-232131 | 10/2009 |
| JP | 2010-502082 | 1/2010 |
| JP | 2011-019263 | 1/2011 |
| WO | 2007-091675 | 8/2007 |
| WO | 2008-053653 | 5/2008 |

OTHER PUBLICATIONS

International Preliminary Report on Patentability with Written Opinion of the International Searching Authority for corresponding International Patent Application No. PCT/JP2012/057066 issued Oct. 2, 2014.

Extended European search report with the supplementary European search report and the European search opinion issued for corresponding European Patent Application No. 12871903.6 dated Feb. 24, 2015.

International Search Report for corresponding PCT Application No. PCT/JP2012/057066, mailed Jun. 26, 2012.

* cited by examiner

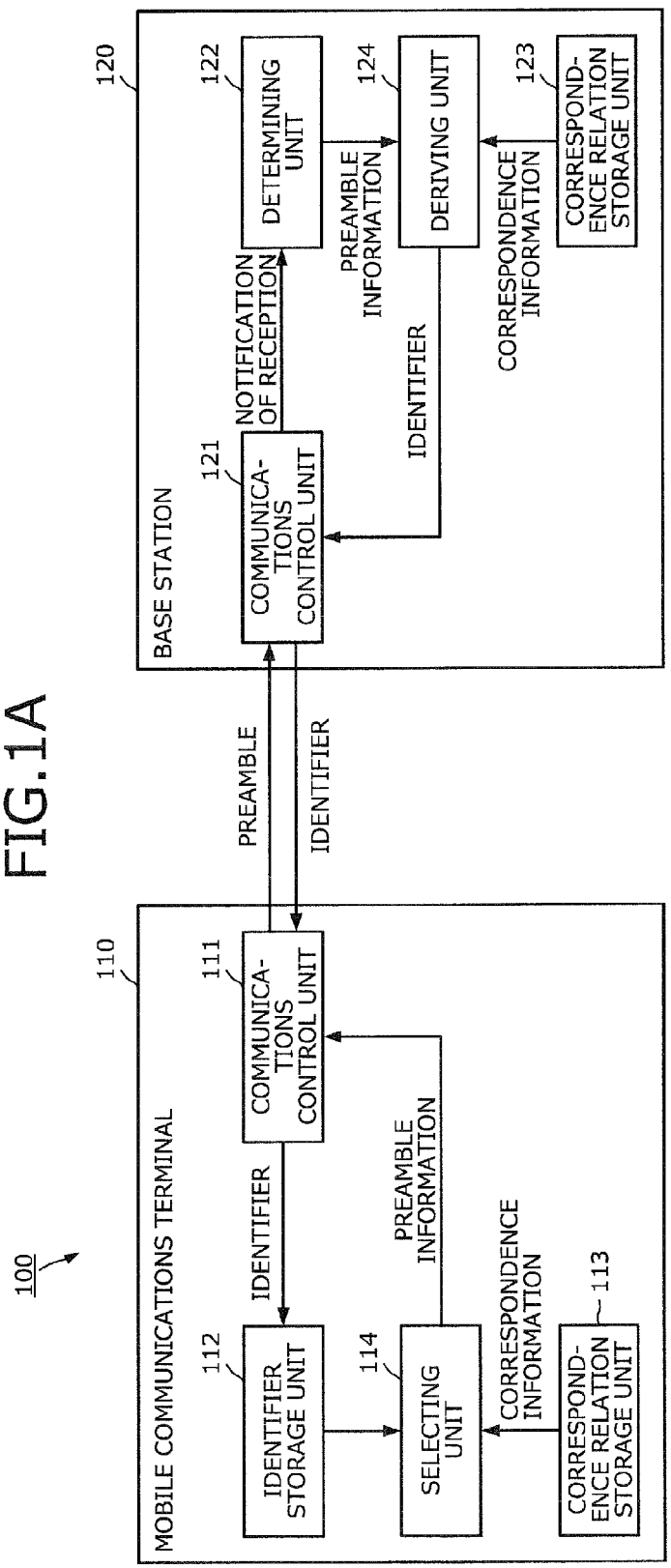

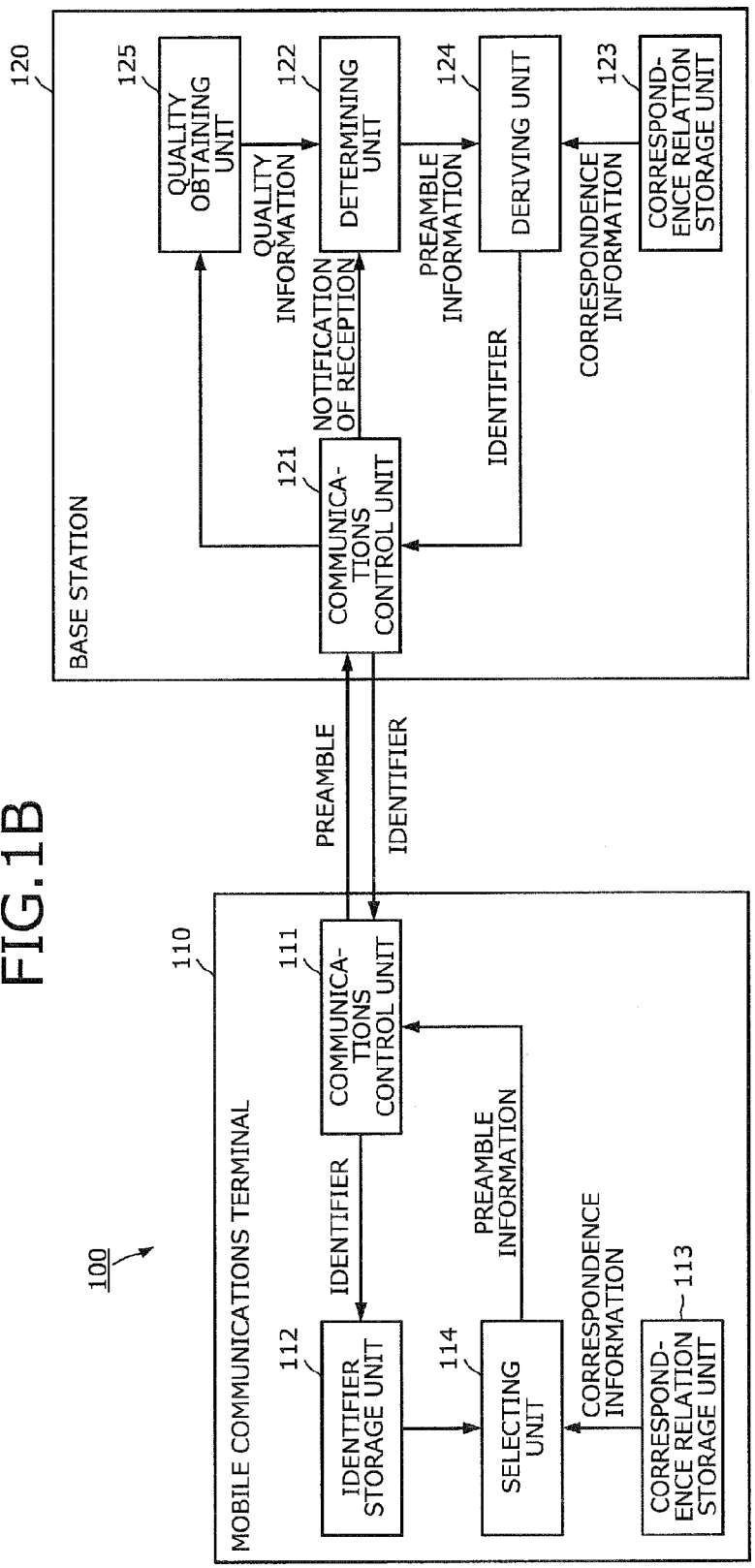

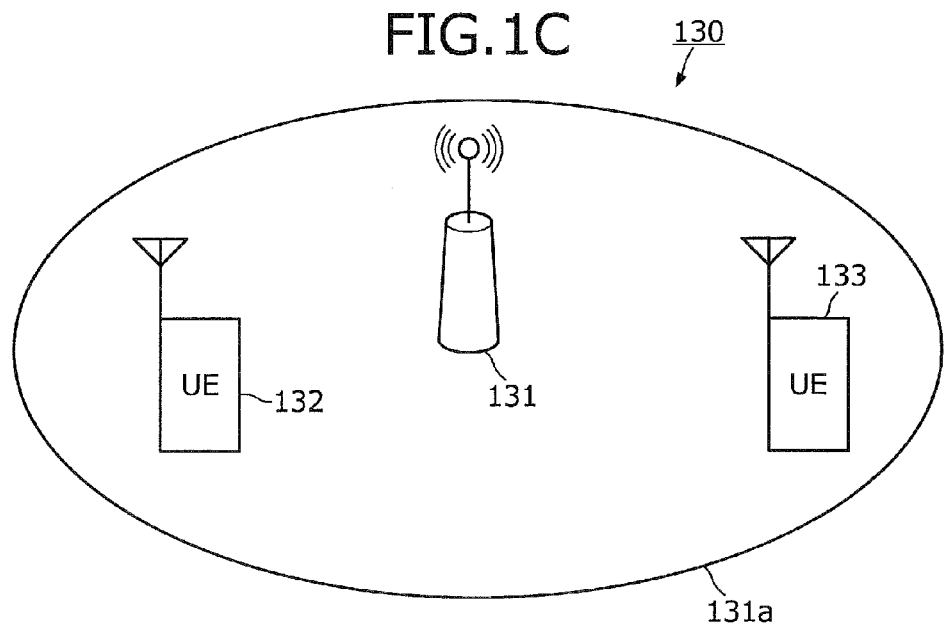
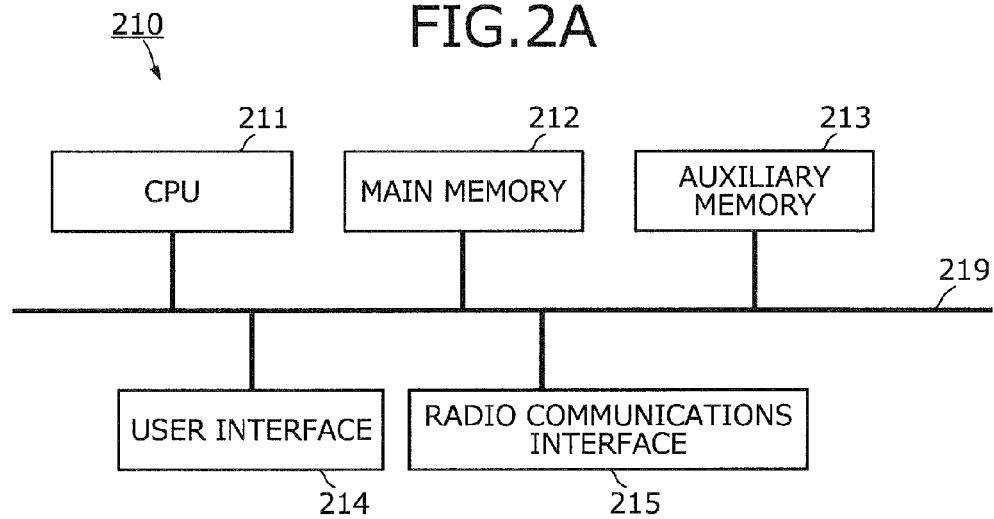

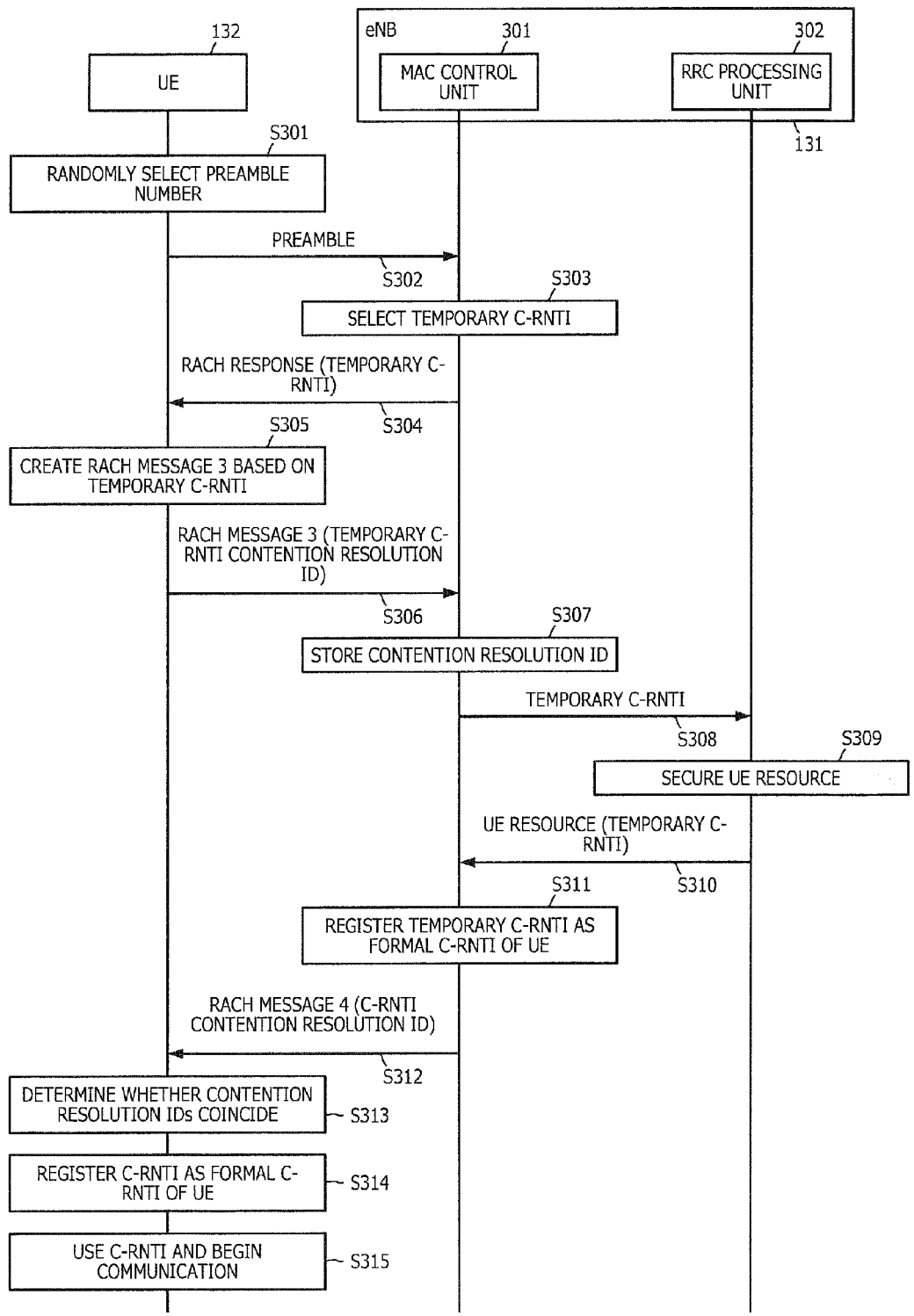

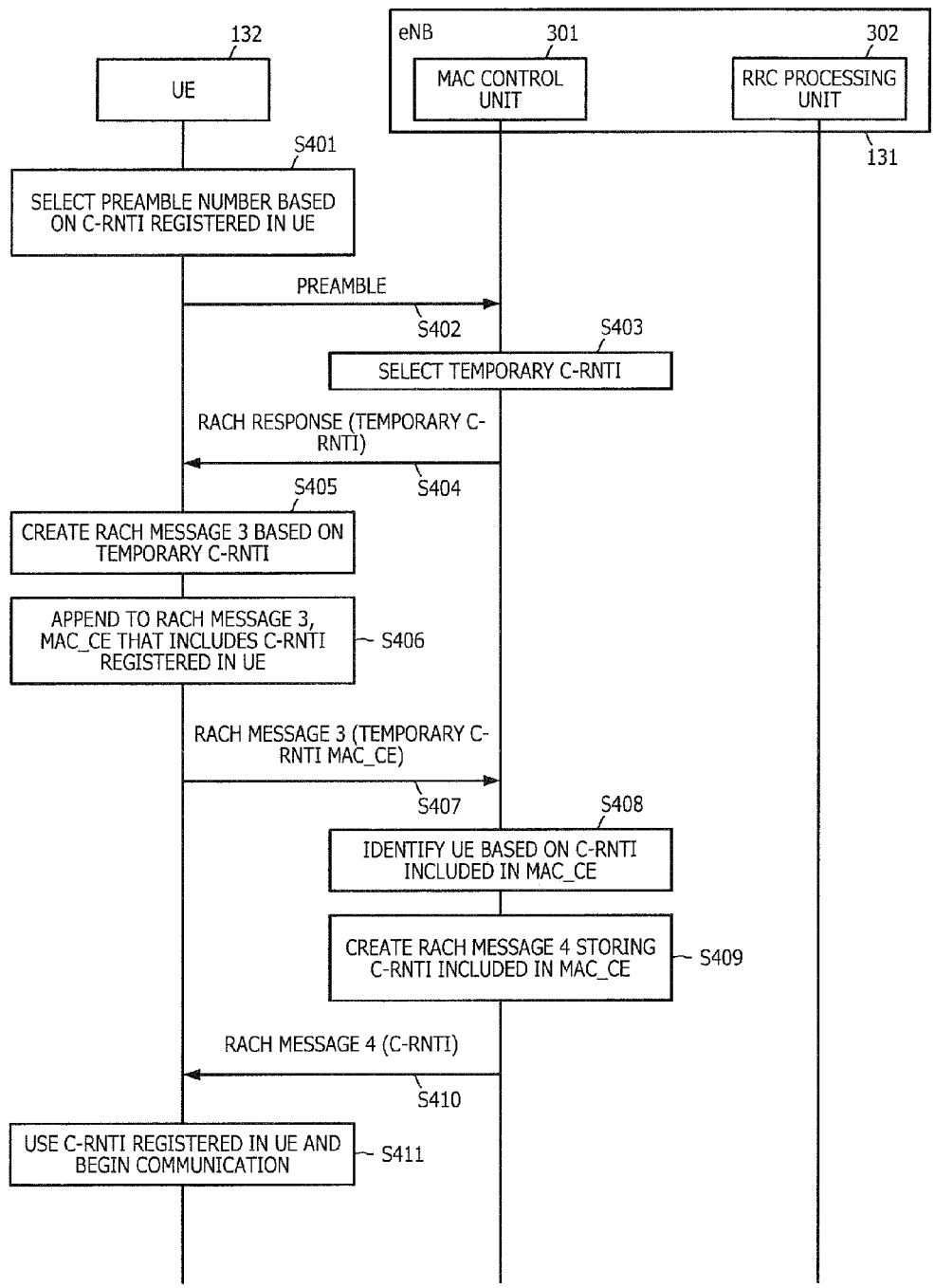

| QUALITY INFORMATION | PREAMBLE NUMBER |
|---|---|
| Q1 | P1 |
| Q2 | P2 |
| ⋮ | ⋮ |
| Qn | Pn |

FIG.10

GROUP NUMBER: #0 #1 #2 #3 #4 #5 #6 #7

PREAMBLE NUMBER: 0···7  8···15  ···  ···63

| QUALITY INFORMATION | GROUP NUMBER |
|---|---|
| Q1 | G1 |
| Q2 | G2 |
| ⋮ | ⋮ |
| Qn | Gn |

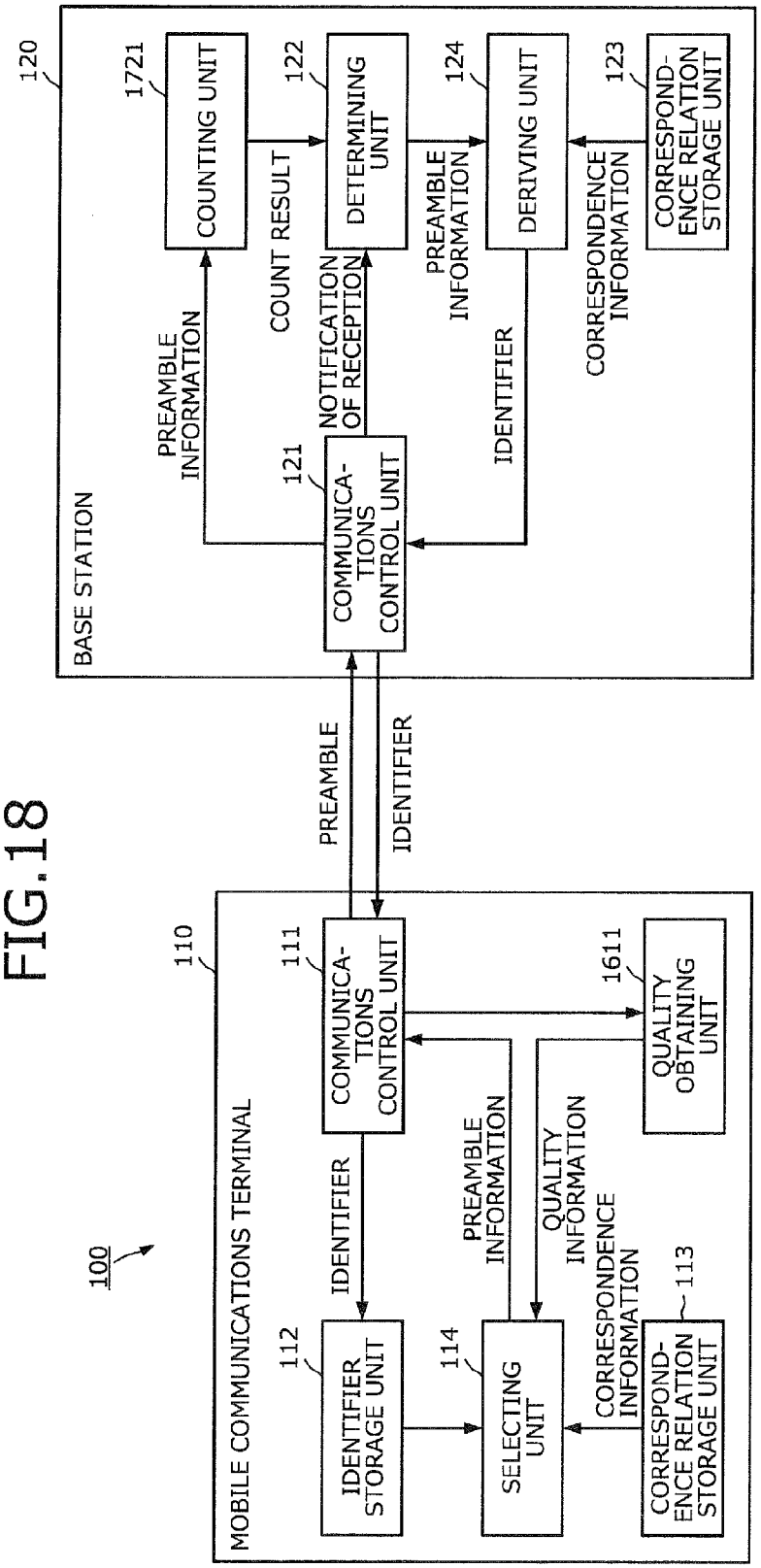

COMMUNICATIONS SYSTEM, COMMUNICATIONS METHOD, MOBILE COMMUNICATIONS TERMINAL, AND BASE STATION

CROSS REFERENCE TO RELATED APPLICATIONS

This application is a continuation application of International Application PCT/JP2012/057066, filed on Mar. 19, 2012 and designating the U.S., the entire contents of which are incorporated herein by reference.

FIELD

The embodiments discussed herein are related to a communications system, a communications method, a mobile communications terminal, and a base station.

BACKGROUND

Long Term Evolution (LTE) systems including LTE and LTE-Advanced, for example, are known as communications systems in mobile communications terminals such as mobile telephones (for example, refer to International Publication No. 2007/091675). In an LTE system, in a connection sequence for initial access to establish UE connection by user equipment ((UE) user terminal) or for connection to a handover destination, a random access channel (RACH) is used by the UE to request an evolutional Node B ((eNB) base station) to assign a communication channel.

Further in an LTE system, a RACH is used for resynchronization and reconnection, and UL/DL resumption (return from a power-saving state). Thus, in an LTE system, for example, compared to a 3G system, the frequency of RACH utilization is several times higher. RACHs include two types, contention based RACHs and non-contention RACHs.

With contention based RACHs, the UE side randomly selects a preamble and therefore, multiple UEs may select the same preamble resource and collisions in the transmitting and receiving of RACH responses and RACH messages 3 have the potential of occurring. Such collisions are responsible for interference in the random access procedure (RA procedure).

A contention based RACH assumes such collisions and, the UE that properly decodes RACH message 3 is ultimately considered the winner UE by the eNB side and the random access procedure is successful. On the UE side, RACH message 3 is used to transmit a contention resolution (resolution) ID that is unique to each UE. If the contention resolution ID returned in RACH message 4 from the eNB coincides with the contention resolution ID of the UE, the UE recognizes the random access procedure to be successful.

On the other hand, with non-contention random access, although the same preamble number is not simultaneously used, 64 preamble resources for one cell are provided, among which a portion is used as dedicated preambles for non-contention random access. Therefore, if the number of UEs in a single cell increases, preamble resources for non-contention random access are depleted causing transition to contention based random access, in turn causing interference in the random access procedure.

In an LTE system in this state, to suppress interference if the UE repeatedly increases the preamble, a back-off indicator that controls the interval at which the UE preamble is transmitted is prepared. Further, if the number of preambles that the eNB receives increases consequent to an increase in the UEs in the cell, the back-off indicator is used to increase the interval at which each UE transmits the preamble, whereby interference is reduced. The back-off indicator provides control on a cellular basis.

In the reception of a preamble from a UE, power ramping is implemented to increase the success rate of the RACH sequence by increasing the preamble output power each time the preamble is retransmitted. However, as described above, with consideration that in the LTE system, the frequency of RACH utilization is high, since the UEs randomly select a preamble, if the number of UEs in the cell increases, it can be assumed that the RACH sequence will be performed simultaneously by numerous UEs. Therefore, the probability of RACH sequence failure consequent to PRACH interference increases.

Further, control that adjusts the preamble transmission interval by the back-off indicator is insufficient in reducing interference when the number of UEs increases. In other words, even if preamble transmission intervals for UEs are made available, if the UEs request the RACH sequence at an identical timing, reduction in interference is not achieved. Further, if the preamble transmission interval is increased by back-off indicator control, the time increases until preamble transmission for resynchronization and UL resumption, thereby inviting increased delays in UE resynchronization and recovery from a power-saving state.

Meanwhile, if the number of UEs in a cell in a LTE system increases, improved system throughput by reductions in interference consequent to the RACH sequence and improved RACH success rates reduce delays in UE resynchronization and recovery from a power-saving state. Therefore, reduction of preamble collisions occurring in the contention based RACH procedure is sought.

Nonetheless, with the conventional contention based RACH schemes above, a problem arises in that since the UEs randomly select a preamble, reductions in interference cannot be facilitated by controlling via the eNB, the preamble that the UEs select.

SUMMARY

According to an aspect of an embodiment, a communications system includes a base station; and a mobile communications terminal, where the base station and the mobile communications terminal execute a random access procedure, and perform radio communication. The base station is configured to assign to the mobile communications terminal, in the random access procedure, an identifier that corresponds to preamble information, the base station assigning the identifier based on first correspondence information that indicates a given correspondence relation of the preamble information to be transmitted by the mobile communications terminal and the identifier assigned to mobile communications terminal. The mobile communications terminal is configured to execute the random access procedure with the base station by transmitting to the base station, the preamble information that corresponds to the identifier assigned by the base station.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1A is a diagram depicting an example of a configuration of a communications system according to a first embodiment;

FIG. 1B is a diagram depicting a modification example of the configuration of the communications system according to the first embodiment;

FIG. 1C is a diagram depicting an application example of the communications system according to the first embodiment;

FIG. 2A is a diagram depicting an example of UE hardware configuration;

FIG. 3 is a diagram depicting an example of a sequence of a contention based RACH procedure during initial access;

FIG. 4 is a diagram depicting an example of a sequence of the contention based RACH procedure for second and subsequent sessions;

FIG. 9 is a diagram depicting an example of correspondence information for quality information and preamble numbers;

FIG. 10 is a diagram depicting an example of preamble grouping;

FIG. 11 is a diagram depicting an example of correspondence information for quality information and group numbers;

FIG. 18 is a diagram depicting another example of a configuration of the communications system according to a fourth embodiment.

DESCRIPTION OF EMBODIMENTS

Figure 2B:
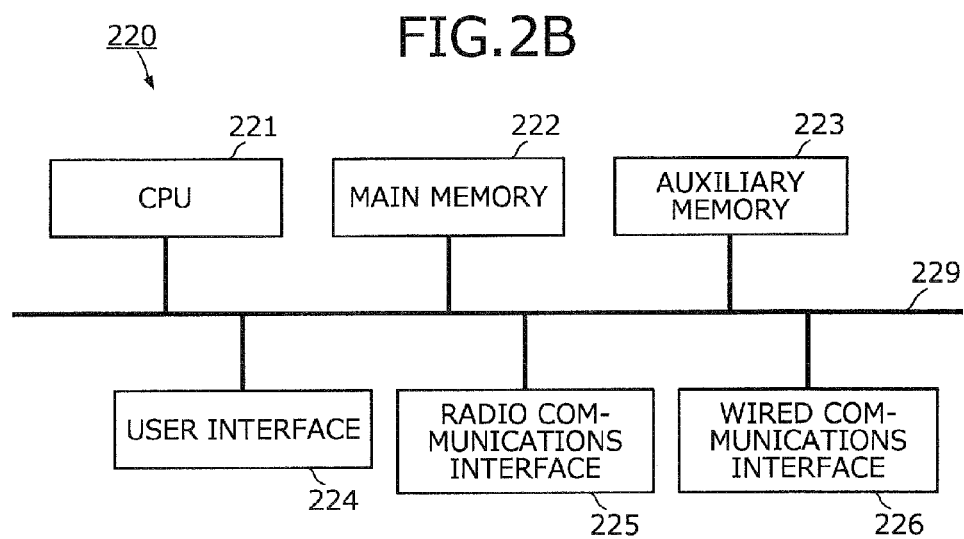
FIG. 2B is a diagram depicting an example of eNB hardware configuration.

Embodiments of a communications system, a communications method, a mobile communications terminal, and a base station according to the present invention will be described in detail with reference to the accompanying drawings.

FIG. 1A is a diagram depicting an example of a configuration of a communications system according to a first embodiment. As depicted in FIG. 1A, a communications system 100 according to the first embodiment includes a mobile communications terminal 110 and a base station 120. The mobile communications terminal 110 performs random access (random access procedure) with respect to the base station 120. The random access performed by the mobile communications terminal 110 is, for example, contention based random access (contention based RACH).

The mobile communications terminal 110 and the base station 120 perform radio communication with one another using an identifier assigned to the mobile communications terminal 110 by the base station 120. The identifier is assigned to the mobile communications terminal 110 by the base station 120 during random access of the base station 120 by the mobile communications terminal 110. The identifier, for example, is a Cell-Radio Network Temporary Identity (C-RNTI).

The mobile communications terminal 110 includes a communications control unit 111, an identifier storage unit 112, a correspondence relations storage unit 113, and a selecting unit 114. The communications control unit 111 performs random access with respect to the base station 120, when the mobile communications terminal 110 performs radio communication with the base station 120. More specifically, the communications control unit 111 transmits a preamble to the base station 120 to thereby request the base station 120 to assign an identifier to the mobile communications terminal 110.

When the base station 120 assigns an identifier to the mobile communications terminal 110 and transmits the assigned identifier to the mobile communications terminal 110, the communications control unit 111 performs radio communication using the identifier transmitted from the base station 120. Further, the communications control unit 111 outputs to the identifier storage unit 112, the identifier transmitted from the base station 120.

The communications control unit 111 transmits to the base station 120, a preamble that is based on preamble information notified by the selecting unit 114. For example, preamble correspondence information correlating preamble information and preambles is stored in the memory of the mobile communications terminal 110. The communications control unit 111 generates based on the preamble correspondence information, a preamble corresponding to the preamble information notified by the selecting unit 114, and transmits the generated preamble to the base station 120. If multiple preambles corresponding to the preamble information are present as candidates, the communications control unit 111 selects a preamble from among the preambles, and generates and transmits the selected preamble.

The identifier storage unit 112 stores the identifier output from the communications control unit 111. Therefore, the identifier storage unit 112 stores identifiers assigned to the mobile communications terminal 110 consequent to random access.

The correspondence relations storage unit 113 stores correspondence information indicating given correspondence relations between identifiers assigned by the base station 120 and the preamble information. A given correspondence relation is shared by the mobile communications terminal 110 and the base station 120, and is preliminarily set. The preamble information, for example, is information indicating the preamble to be used for random access. Information indicating a preamble is, for example, a preamble number 0 to 63 in the case of 64 preambles.

Alternatively, the preamble information may be information indicating a candidate for the preamble to be used for random access. For example, the preamble numbers are divided into multiple groups and the preamble information indicates a group of preamble numbers. In this case, one or more preamble numbers included in the group indicated by the preamble information is a candidate for the preamble to be used for random access.

The correspondence information stored in the correspondence relations storage unit 113, for example, is a function that can calculate preamble information from an identifier. Alternatively, the correspondence information stored in the correspondence relations storage unit 113 may be a table correlating identifiers and preamble information.

The selecting unit 114 selects based on the correspondence information stored in the correspondence relations storage unit 113, preamble information corresponding to the identifier stored in the identifier storage unit 112. In other words, the selecting unit 114 selects preamble information that satisfies a given correspondence relation between identifiers stored in the identifier storage unit 112 and indicated by correspondence information stored in the correspondence relations storage unit 113.

If the identifier assigned by the base station 120 is not stored in the identifier storage unit 112 at the time of initial access to the base station 120, the selecting unit 114, for example, randomly selects preamble information. Alternatively, if the identifier is not stored in the identifier storage unit 112, the selecting unit 114 may select preamble information according to the propagation quality with respect to the base station 120. The selecting unit 114 notifies the communications control unit 111 of the selected preamble information.

Thus, if the identifier assigned by the base station 120 is present, the mobile communications terminal 110 can perform random access with respect to the base station 120 by the preamble corresponding to the identifier assigned by the base station 120.

The base station 120 includes a communications control unit 121, a determining unit 122, a correspondence relations storage unit 123, and a deriving unit 124. The communications control unit 121 processes the random access from the mobile communications terminal 110. More specifically, the communications control unit 121, upon receiving a preamble from the mobile communications terminal 110, outputs reception notification to the determining unit 122. The communications control unit 121, by outputting the reception notification, assigns an identifier from the deriving unit 124 to the mobile communications terminal 110, and transmits the assigned identifier to the mobile communications terminal 110.

The determining unit 122, when the reception notification is output by the communications control unit 121, determines the preamble information to be selected by the mobile communications terminal 110 in a future (e.g., next) random access session with the base station 120, and notifies the deriving unit 124 of the determined preamble information. Determination of the preamble information by the determining unit 122 will be described hereinafter.

The correspondence relations storage unit 123 stores correspondence information indicating the same relations as given correspondence relations indicated by correspondence information stored in the correspondence relations storage unit 113 of the mobile communications terminal 110. The correspondence information stored in the correspondence relations storage unit 123, for example, is a function for calculating an identifier from preamble information. Alternatively, the correspondence information stored in correspondence relations storage unit 123 may be a table correlating identifiers and preamble information.

The deriving unit 124 derives based on the correspondence information stored in the correspondence relations storage unit 123, an identifier corresponding to the preamble information notified by the determining unit 122. In other words, the deriving unit 124 derives an identifier that satisfies a given correspondence relation with the preamble information notified by the determining unit 122 and indicated by correspondence information stored in the correspondence relations storage unit 123. Thus, the deriving unit 124 can derive an identifier for causing the mobile communications terminal 110 to select the preamble information notified by the determining unit 122. The deriving unit 124 notifies the communications control unit 121 of the derived identifier.

FIG. 1B is a diagram depicting a modification example of the configuration of the communications system according to the first embodiment. As depicted in FIG. 1B, the base station 120 may further include a quality obtaining unit 125 in addition to the configuration depicted in FIG. 1A. The quality obtaining unit 125 obtains quality information indicating the propagation quality of the radio communication between the mobile communications terminal 110 and the base station 120.

For example, the quality obtaining unit 125 obtains from the communications control unit 121, the preamble received from the mobile communications terminal 110 and based on the obtained preamble, obtains the quality information by measuring the propagation quality. Alternatively, via the communications control unit 111, the quality obtaining unit 125 may obtain quality information indicating the propagation quality measured at the mobile communications terminal 110.

The quality obtaining unit 125 outputs the obtained quality information to the determining unit 122. The determining unit 122 determines the preamble information corresponding to the quality information output from the quality obtaining unit 125. Thus, the preamble transmitted by the mobile communications terminal 110 can be controlled according to the propagation quality of the radio communication with the base station 120.

FIG. 1C is a diagram depicting an application example of the communications system according to the first embodiment. A communications system 130 depicted in FIG. 1C is an LTE system (LTE or LTE-Advanced) to which the communications system 100 depicted in FIG. 1A or FIG. 1B is applied.

The communications system 130 includes an eNB 131 and UEs 132, 133. The eNB 131 is of a configuration corresponding to the base station 120 depicted in FIG. 1A. A coverage area 131*a* is the coverage area of the eNB 13. The UEs 132, 133 are respectively of a configuration corresponding to the mobile communications terminal 110 depicted in FIG. 1A. The UEs 132, 133 are located in the coverage area 131*a* and perform radio communication with the base station 120.

Random access by the UEs 132, 133 with respect to the eNB 131 is performed during initial access, resynchronization in a case of lost synchronization, handover, etc. Further, when there is no fixed time interval data communication, the random access by the UEs 132, 133 with respect to the eNB 131 may be performed after the UE releases the UL resource (terminates communication), during resumption when communication is resumed, etc. Resumption may include UL resumption triggered from the UE 132 side and DL resumption triggered from the eNB 131 side.

Hereinafter, although random access between the eNB 131 and the UE 132 will be primarily described, random access between the eNB 131 and the UE 133 is the same.

FIG. 2A is a diagram depicting an example of UE hardware configuration. The UE 132 depicted in FIG. 1C, for example, may be implemented by a communications apparatus 210 depicted in FIG. 2A. The communications apparatus 210 includes a CPU 211, main memory 212, auxiliary memory 213, a user interface 214, and a radio communication interface 215. The CPU 211, the main memory 212, the auxiliary memory 213, the user interface 214, and the radio communication interface 215 are connected by a bus 219.

The central processing unit (CPU) 211 governs overall control of the communications apparatus 210. Further, the communications apparatus 210 may include the CPU 211 in plural. The main memory 212, for example, is random access memory (RAM). The main memory 212 is used as a work area of the CPU 211. The auxiliary memory 213 is, for example, non-volatile memory such as a hard disk, an optical disk, and flash memory. The auxiliary memory 213 stores various types of programs causing the communications apparatus 210 to operate. The programs stored in the auxiliary memory 213 are loaded to the main memory 212 and executed by the CPU 211.

The user interface 214, for example, includes an input device that receives operational input from the user and an output device that outputs information to the user. The input device, for example, may be implemented by keys (e.g., a keyboard), a remote controller, etc. The output device, for example, may be implemented by a display, speakers, etc. Further, the input device and the output device may be implemented by a touch panel. The user interface 214 is controlled by the CPU 211.

The radio communication interface 215, for example, is a communications interface that performs radio communication with an external device (e.g., the eNB 131) of the communications apparatus 210. The radio communication interface 215 is controlled by the CPU 211.

The communications control unit 111 depicted in FIG. 1A, for example, may be implemented by the CPU 211 and the radio communication interface 215. The identifier storage unit 112 and the correspondence relations storage unit 113 depicted in FIG. 1A, for example, may be implemented by the main memory 212 or the auxiliary memory 213. The selecting unit 114 depicted in FIG. 1A, for example, may be implemented by the CPU 211.

FIG. 2B is a diagram depicting an example of eNB hardware configuration. The eNB 131 depicted in FIG. 1C, for example, may be implemented by a communications apparatus 220 depicted in FIG. 2B. The communications apparatus 220 includes a CPU 221, main memory 222, auxiliary memory 223, a user interface 224, a radio communication interface 225, and a wired communications interface 226. The CPU 221, the main memory 222, the auxiliary memory 223, the user interface 224, the radio communication interface 225, and the wired communications interface 226 are connected by a bus 229.

The CPU 221, the main memory 222, the auxiliary memory 223, and the user interface 224 are respectively identical to the CPU 211, the main memory 212, the auxiliary memory 213, and the user interface 214 depicted in FIG. 2A.

The radio communication interface 225, for example, is a communications interface that performs radio communication with an external device (e.g., the UE 132) of the communications apparatus 220. The radio communication interface 225 is controlled by the CPU 221.

The wired communications interface 226, for example, is a communications interface that performs wired communication with an external device (e.g., backbone network) of the communications apparatus 220. The wired communications interface 226 is controlled by the CPU 221.

The communications control unit 121 depicted in FIG. 1A, for example, may be implemented by the CPU 221 and the radio communication interface 225. The determining unit 122 and the deriving unit 124 depicted in FIG. 1A, for example, may be implemented by the CPU 221. The correspondence relations storage unit 123 depicted in FIG. 1A, for example, may be implemented by the main memory 222 or the auxiliary memory 223. The quality obtaining unit 125 depicted in FIG. 1B, for example, may be implemented by the CPU 221.

FIG. 3 is a diagram depicting an example of a sequence of the contention based RACH procedure during initial access. As depicted in FIG. 3, the eNB 131 includes a MAC control unit 301 and an RRC processing unit 302. The MAC control unit 301 performs Media Access Control (MAC) processing. The RRC processing unit 302 performs Radio Resource Control (RRC) processing. The MAC control unit 301 and the RRC processing unit 302, for example, may be implemented by the CPU 221 depicted in FIG. 2B.

In the communications system 130 depicted in FIG. 1C, the following steps, for example, are performed as the contention based RACH procedure during the initial access of the eNB 131 by the UE 132. The UE 132, for example, randomly selects a preamble number from 0 to 63 (step S301). The UE 132 transmits to the eNB 131, the preamble that corresponds to the preamble number selected at step S301 (step S302).

The MAC control unit 301 of the eNB 131 selects a temporary C-RNTI to be temporarily assigned to the UE 132 (step S303). The MAC control unit 301 transmits to the UE 132, a RACH response that includes the temporary C-RNTI selected at step S303 (step S304).

The UE 132 creates a RACH message 3 based on the temporary C-RNTI included in the RACH response transmitted at step S304 (step S305). The RACH message 3 includes the temporary C-RNTI included in the RACH response transmitted at step S304 and a contention resolution ID. The contention resolution ID is a terminal-specific ID.

The UE 132 transmits to the eNB 131, the RACH message 3 created at step S305 (step S306). The MAC control unit 301 of the eNB 131 stores to the memory of the eNB 131, the contention resolution ID included in the RACH message 3 transmitted at step S306 (step S307). The memory of the eNB 131, for example, is the main memory 222 or the auxiliary memory 223 depicted in FIG. 2B. The MAC control unit 301 notifies the RRC processing unit 302 of the temporary C-RNTI included in the RACH message 3 transmitted at step S306 (step S308).

The RRC processing unit 302 secures a UE resource for the UE 132, based on the notification at step S308 (step S309). For example, the UE resource is a terminal number assigned at the eNB 131, for a UE connected to the eNB 131. The RRC processing unit 302 correlates and notifies the MAC control unit 301 of UE resource (e.g., terminal number) secured at step S309 and the temporary C-RNTI notified at step S308 (step S310).

The MAC control unit 301 registers the temporary C-RNTI included in the RACH message 3 transmitted at step S306 as the formal C-RNTI of the UE 132 (accessing UE) (step S311). For example, the MAC control unit 301 correlates and stores to the memory of the eNB 131, the UE resource notified at step S310 and the temporary C-RNTI, and thereby, registers the temporary C-RNTI as the formal C-RNTI of the UE 132.

The MAC control unit 301 transmits to the UE 132, a RACH message 4 that includes the formal C-RNTI registered at step S311 and the contention resolution ID stored at step S307 (step S312).

The UE 132 determines whether the contention resolution ID included in the RACH message 4 transmitted at step S312 and the contention resolution ID unique to the UE 132 coincide (step S313). If the contention resolution IDs coincide, UE resource assignment to the UE 132 by the eNB 131 can be determined to be set.

In this case, the UE 132 registers the C-RNTI included in RACH message 4 transmitted at step S312 as the formal C-RNTI of the UE 132 (step S314). More specifically, the UE 132 stores to the memory of the UE 132, the C-RNTI included in the RACH message 4.

The UE 132 uses the C-RNTI registered at step S314 and begins communication with the eNB 131 (step S315). At step S313, if the contention resolution IDs do not coincide, the UE 132 determines that the UE resource has not been assigned to the UE 132, returns to step S301, and resumes random access.

FIG. 4 is a diagram depicting an example of a sequence of the contention based RACH procedure for second and subsequent sessions. In the communications system 130 depicted in FIG. 1C, the following steps, for example, are performed as the contention based RACH procedure for the second and subsequent sessions by the UE 132 with respect to the eNB 131, when synchronization loss, resumption, handover, etc. occur.

The UE 132 selects a preamble number based on the C-RNTI registered in the UE 132 (step S401). A C-RNTI registered in the UE 132 is, for example, the formal C-RNTI registered at step S314 in FIG. 3. The selection of a preamble number based on the C-RNTI will be described hereinafter. The UE 132 transmits to the eNB 131, the preamble that corresponds to the preamble number selected step S401 (step S402).

The MAC control unit 301 of the eNB 131 selects a temporary C-RNTI to be temporarily assigned to the UE 132 (step S403). The MAC control unit 301 transmits to the UE 132, a RACH response that includes the temporary C-RNTI selected at step S403 (step S404). The UE 132 creates a RACH message 3 based on the temporary C-RNTI transmitted at step S404 (step S405).

The UE 132 appends to the RACH message 3 created at step S405, a MAC_CE storing the C-RNTI registered in the UE 132 (step S406). Therefore, the RACH message 3 includes the temporary C-RNTI transmitted at step S404 and a MAC_CE storing the C-RNTI registered in the UE 132. The UE 132 transmits to the eNB 131, the RACH message 3 to which the MAC_CE is appended at step S406 (step S407).

The MAC control unit 301 of the eNB 131 identifies the UE 132 based on the C-RNTI included in the MAC_CE appended to the RACH message 3 transmitted at the step S407 (step S408). More specifically, the MAC control unit 301 searches the memory of the eNB 131 for a resource (e.g., terminal number) for the UE that is correlated with the C-RNTI included in the MAC_CE and registered.

The MAC control unit 301 creates a RACH message 4 storing the C-RNTI included in the MAC_CE appended to the RACH message 3 transmitted at step S407 (step S409).

The MAC control unit 301 transmits to the UE 132, the RACH message 4 created at step S409 (step S410). The UE 132 uses the C-RNTI registered in the UE 132 and begins communication with the eNB 131 (step S411).

Through such steps as described above, the preamble transmitted by the UE 132 during random access such as during a second access session by the UE 132 to the eNB 131, handover, reconnection (re-establishment) etc., can be controlled by the eNB 131.

Figure 5:
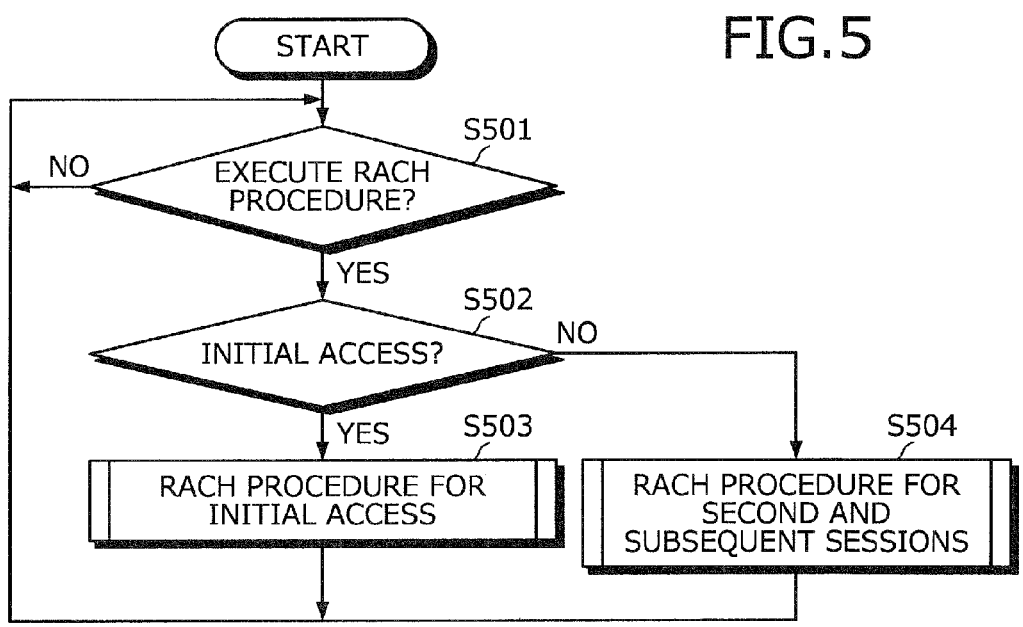
FIG. 5 is a flowchart depicting an example of UE operation.

FIG. 5 is a flowchart depicting an example of UE operation. The UE 132, for example, executes the following steps. The UE 132 determines whether a RACH procedure with respect to the eNB 131 is to be executed (step S501), and if not, stands by until determining that a RACH procedure is to be executed (step S501: NO). For example, the UE 132 determines that a RACH procedure is to be executed when the UE 132 approaches the coverage area 131a of the eNB 131, in the case of handover to the eNB 131, resynchronization, reconnection, UL/DL resumption, etc.

At step S501, if execution of a RACH procedure has been determined (step S501: YES), the UE 132 determines whether access of the eNB 131 by the RACH procedure to be executed is an initial access to the eNB 131 (step S502). If the access is an initial access (step S502: YES), the UE 132 executes a RACH procedure for initial access (step S503), and returns to step S501. A RACH procedure for initial access will be described hereinafter (for example, refer to FIG. 6).

At step S502, if the access is not an initial access (step S502: NO), the UE 132 executes the RACH procedure that is for the second and subsequent sessions (step S504), and returns to step S501. The RACH procedure for the second and subsequent sessions will be described hereinafter (for example, refer to FIG. 7).

Figure 6:
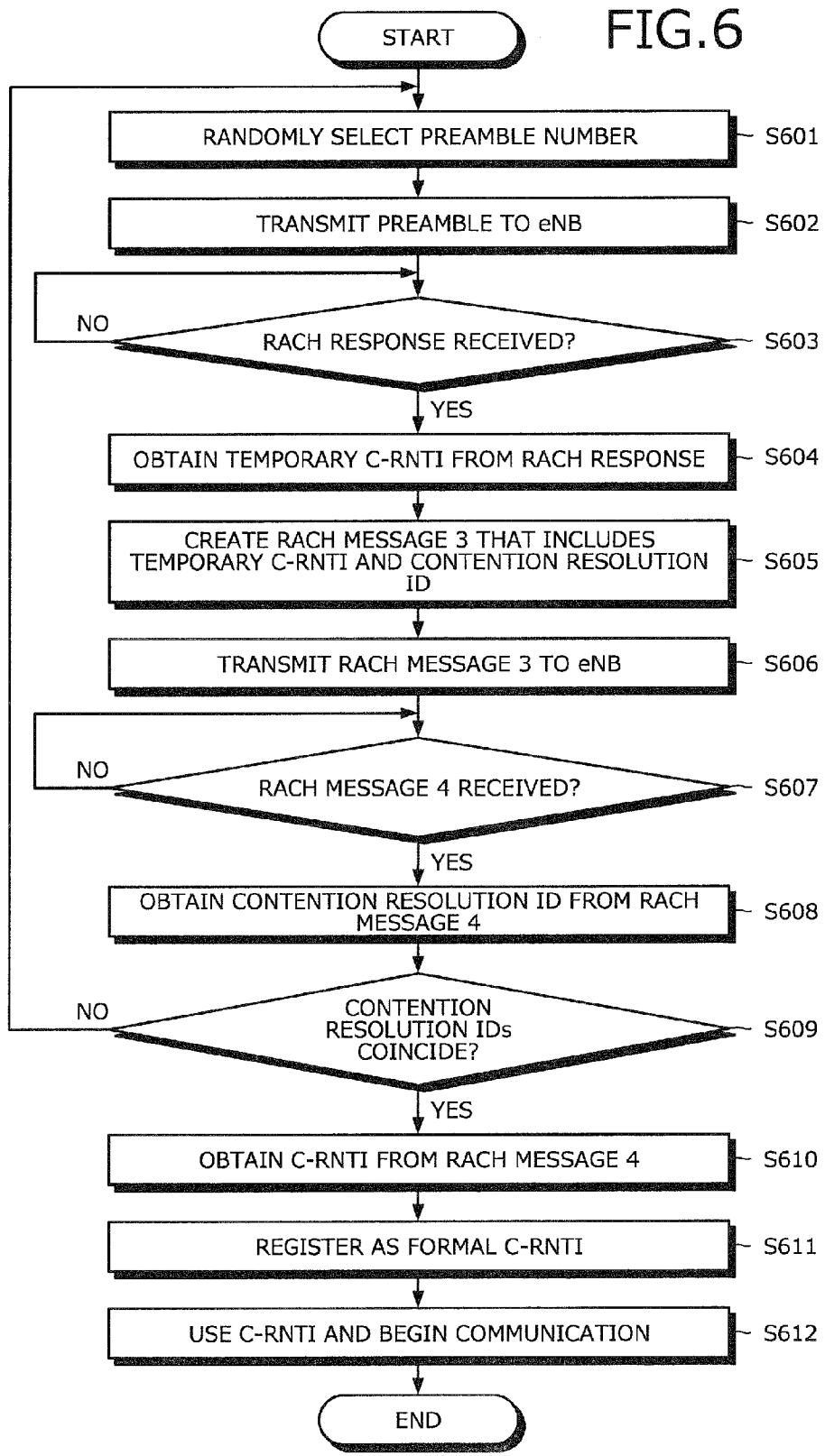
FIG. 6 is a flowchart depicting an example of a RACH procedure for initial access by the UE.

FIG. 6 is a flowchart depicting an example of a RACH procedure for initial access by the UE. The UE 132, at step S503 depicted in FIG. 5, for example, executes the following steps. The UE 132 randomly selects a preamble number, for example, 0 to 63 (step S601). The UE 132 transmits to the eNB 131, the preamble that corresponds to the preamble number selected at step S601 (step S602).

The UE 132 determines whether a RACH response has been received from the eNB 131 (step S603), and if not, stands by until a RACH response is received (step S603: NO). When a RACH response has been received (step S603: YES), the UE 132 obtains the temporary C-RNTI from the received RACH response (step S604).

The UE 132 creates a RACH message 3 that includes the temporary C-RNTI obtained at step S604 and the contention resolution ID of the UE 132 (step S605). The UE 132 transmits to the eNB 131, the RACH message 3 created at step S605 (step S606).

The UE 132 determines whether a RACH message 4 has been received from the eNB 131 (step S607), and if not, stands by until a RACH message 4 is received (step S607: NO). When a RACH message 4 is received (step S607: YES), the UE 132 obtains the contention resolution ID from the received RACH message 4 (step S608).

The UE 132 determines whether the contention resolution ID obtained at step S608 and the contention resolution ID of the UE 132 coincide (step S609). If the contention resolution IDs do not coincide (step S609: NO), the UE 132 returns to step S601 and re-executes the RACH procedure. In this case, the UE 132 may increase the transmission power to the eNB 131 and re-execute the RACH procedure.

At step S609, if the contention resolution IDs coincide (step S609: YES), the UE 132 obtains the C-RNTI from the RACH message 4 transmitted at step S607 (step S610). The UE 132 registers the C-RNTI obtained at step S610 as the formal C-RNTI of the UE 132 (step S611). The UE 132 uses the C-RNTI registered at step S611 and begins communication with the eNB 131 (step S612), and ends the RACH procedure for the initial access.

Figure 7:
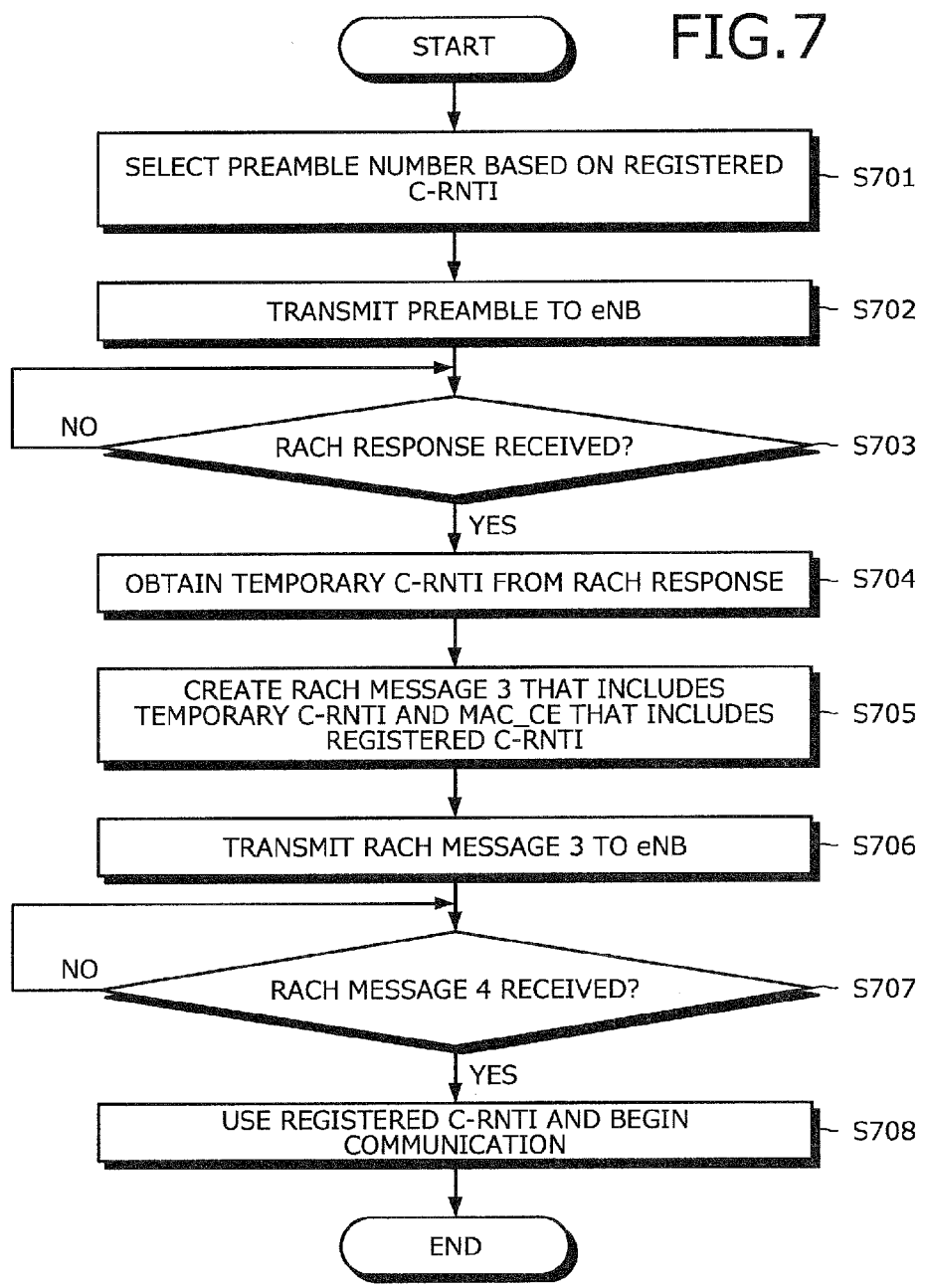
FIG. 7 is a flowchart depicting an example of a RACH procedure for second and subsequent access sessions by the UE.

FIG. 7 is a flowchart depicting an example of a RACH procedure for second and subsequent access sessions by the UE. The UE 132, at step S504 depicted in FIG. 5, for example, executes the following steps. The UE 132 selects a preamble number based on a C-RNTI registered in the UE 132 (step S701). A C-RNTI registered in the UE 132 is, for example, the formal C-RNTI registered at step S611 depicted in FIG. 6.

The UE 132 transmits to the eNB 131, the preamble that coincides with the preamble number selected at step S701 (step S702). The UE 132 determines whether a RACH response has been received from the eNB 131 (step S703), and if not, stands by until a RACH response is received (step S703: NO).

At step S703, when a RACH response has been received (step S703: YES), the UE 132 obtains the temporary C-RNTI from the received RACH response (step S704). The UE 132 creates a RACH message 3 that includes the temporary C-RNTI obtained at step S704 and the MAC_CE that includes the C-RNTI registered in the UE 132 (step S705). The UE 132 transmits to the eNB 131, the RACH message 3 created at step S705 (step S706).

The UE 132 determines whether a RACH message 4 has been received from the eNB 131 (step S707), and if not, stands by until a RACH message 4 is received (step S707: NO). When a RACH message 4 has been received (step S707: YES), the UE 132 uses the C-RNTI registered in the UE 132 and begins communication with the eNB 131 (step S708), and ends the RACH procedure that is for the second and subsequent sessions.

Figure 8:
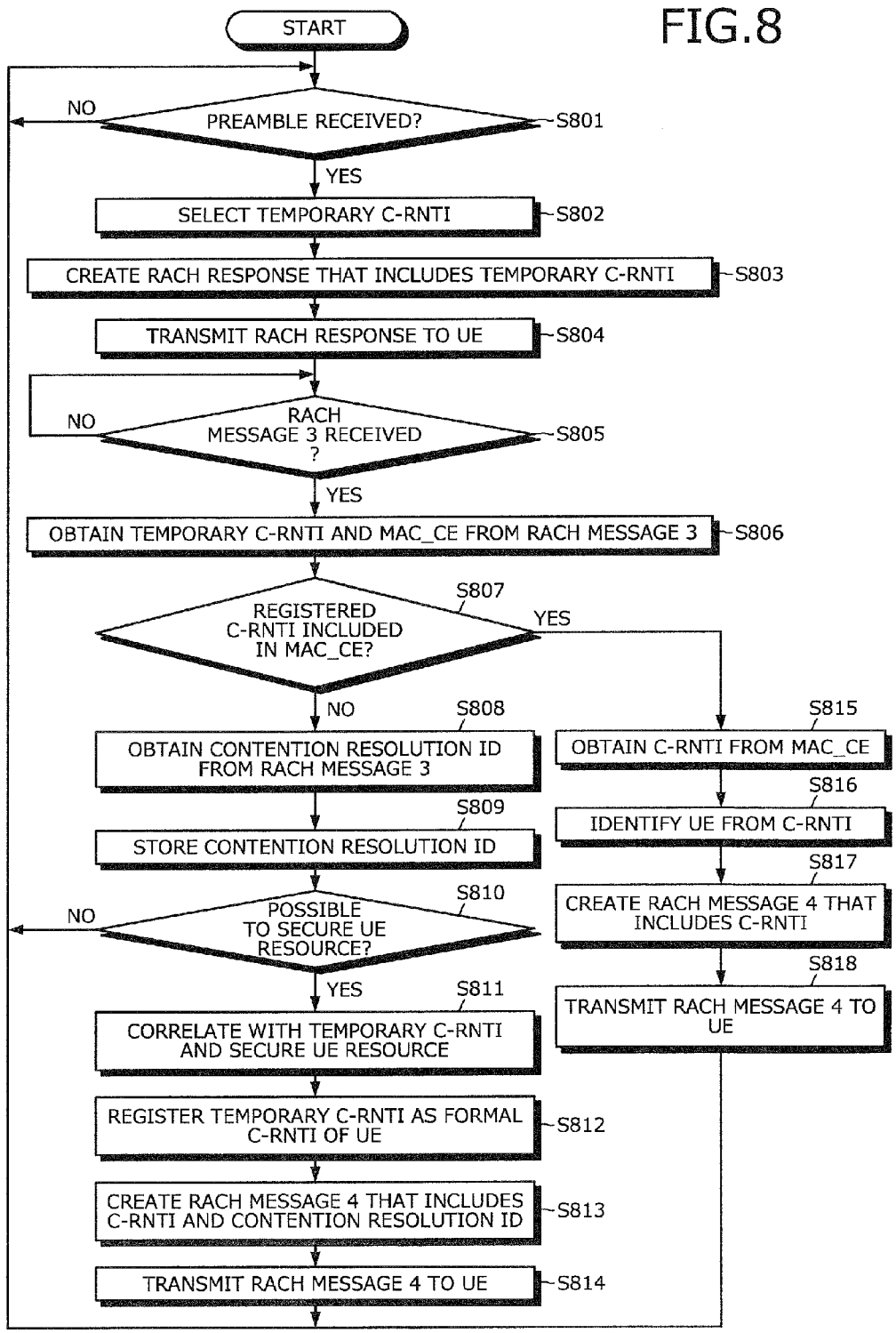
FIG. 8 is a flowchart depicting an example of eNB operation.

FIG. 8 is a flowchart depicting an example of eNB operation. The eNB 131, for example, executes the following steps. The eNB 131 determines whether a preamble from the UE 132 has been received (step S801), and if not, stands by until a preamble is received (step S801: NO). When a preamble has been received (step S801: YES), the eNB 131 selects a temporary C-RNTI that is to be temporarily assigned to the UE 132 (step S802).

The eNB 131 creates a RACH response that includes the temporary C-RNTI selected at step S802 (step S803). The eNB 131 transmits to the UE 132, the RACH response created at step S803 (step S804).

The eNB 131 determines whether a RACH message 3 has been received from the UE 132 (step S805), and if not, stands by until a RACH message 3 is received (step S805: NO). At step S801, when a RACH message 3 has been received (step S805: YES), the eNB 131 obtains the temporary C-RNTI from the received RACH message 3 and if appended to the RACH message 3, the MAC_CE (step S806).

If a MAC_CE is appended, the eNB 131 determines whether a C-RNTI registered in any of the UEs is included in the MAC_CE obtained at step S806 (step S807). If no registered C-RNTI is included in the MAC_CE (step S807: NO), or if no MAC_CE is appended to the RACH message 3, the RACH procedure by the UE 132 is determined to be a RACH procedure for initial access. In this case, to determine that the RACH procedure is for initial access, the eNB 131 may make such determination by an inclusion of a CCCH SDU in the RACH message 3. Thus, the eNB 131 obtains the contention resolution ID of the UE 132 from the RACH message 3 received at step S801 (step S808).

The eNB 131 stores to the memory of the eNB 131, the contention resolution ID obtained at step S808 (step S809). The eNB 131 determines whether a UE resource can be secured for the UE 132 (step S810). For example, at the eNB 131, a maximum number of UEs that can be connected to the eNB 131 is set and the eNB 131 determines whether a UE resource can be secured by determining whether the maximum number of UEs that can be connected to the eNB 131 has been reached.

At step S810, if no UE resource can be secured (step S810: NO), the eNB 131 returns to step S801. If a UE resource can be secured (step S810: YES), the eNB 131 secures a UE resource and correlates the UE resource with the temporary C-RNTI obtained at step S806 (step S811). The eNB 131 registers the temporary C-RNTI obtained at step S806 as the formal C-RNTI of the UE 132 (accessing UE) (step S812).

The eNB 131 creates a RACH message 4 that includes the C-RNTI registered at step S812 and the contention resolution ID stored at step S809 (step S813). The eNB 131 transmits to the UE 132, the RACH message 4 created at step S813 (step S814), and returns to step S801.

At step S807, if a registered C-RNTI is included in the MAC_CE (step S807: YES), the RACH procedure by the UE 132 can be determined to be a RACH procedure for a second or subsequent session. Thus, the eNB 131 obtains the C-RNTI from the MAC_CE obtained at step S806 (step S815).

The eNB 131 identifies the UE 132 based on the C-RNTI obtained at step S815 (step S816). The eNB 131 creates a RACH message 4 that includes the C-RNTI obtained at step S815 (step S817). The eNB 131 transmits to the UE 132, the RACH message 4 created at step S81 (step S818), and returns to step S801.

Equation (1) is stored in the UE 132 and is information indicating a given correspondence relation above. The UE 132, in the RACH procedure for the second and subsequent sessions, for example, selects a preamble number based on Equation (1) and registered C-RNTIs that have been assigned in the past.

$$\text{preamble number} = (\text{C-RNTI} * A1 + A2) \bmod (\text{RA preamble count}) \quad (1)$$

The RA preamble count, for example, is the parameter "number_Of_RA_preambles" defined under 3GPP standards. Among preamble numbers 0 to 63, preamble numbers less than the value specified by the RA preamble count are preamble numbers to be used in the contention-based random access procedure. Among the preamble numbers 0 to 63, preamble numbers greater than or equal to the RA preamble count, for example, are preamble numbers to be used in the non-contention based RACH procedure.

Coefficients A1, A2 are stored in the memory of the UE 132 and the eNB 131, respectively, and are parameters shared by the UE 132 and the eNB 131. By changing coefficients A1, A2, the preamble number selected using the C-RNTI can be adjusted. For example, assuming coefficient A1=4 and coefficient A2=1, then in the numerical sequence indicated by the C-RNTI, every fourth preamble number for the contention-based random access procedure, offset by 1 is selected.

Equation (2) is correspondence information stored in the eNB 131. Equation (2) can be derived by transforming Equation (1), is equivalent to Equation (1), and is correspondence information indicating a given correspondence relation described above.

The eNB 131 determines the preamble number that the UE 132 is to be caused to select. The eNB 131 assumes that at the UE 132, a preamble number will be selected according Equation (1) and thus, selects a C-RNTI so that the UE 132 selects the determined preamble number. More specifically, the eNB 131 can calculate the C-RNTI based on Equation (2) and the determined preamble number.

$$C\text{-}RNTI=\{(RA\ preamble\ count*n+preamble\ number)-A2\}/A1 \quad (2)$$

Where, n, for example, is a positive integer by which "RA preamble count*n" does not exceed the C-RNTI value. "n" is stored only by the eNB and is arbitrarily selected by the eNB when the eNB calculates Equation (2). A multiple n, for example, may be used to increment n and further select a different C-RNTI in a case where the C-RNTI (that has been calculated when Equation (2) is calculated from the preamble number determined by the eNB) has already been assigned to another UE.

By assigning the C-RNTI calculated by Equation (2) to the UE 132, the UE 132 can be caused to select the preamble number determined by the eNB 131. Thus, the selection of a preamble by the UE 132 can be controlled by the eNB 131.

The eNB 131, for example, determines based on the quality information of the UE 132, the preamble number that the UE 132 is to be caused to select. The quality information, for example, can be obtained by measuring the propagation quality, based on the preamble received from the UE 132.

FIG. 9 is a diagram depicting an example of correspondence information for quality information and preamble numbers. Table 900 depicted in FIG. 9 is correspondence information for quality information and preamble numbers. Table 900, for example, is stored in the memory of the eNB 131. Alternatively, table 900 may be information that is received from an external apparatus of the eNB 131.

In table 900, preamble numbers P1 to Pn are correlated with quality information values Q1 to Qn. The eNB 131 obtains from table 900, a preamble number that corresponds to the quality information. The eNB 131 assigns a C-RNTI to the UE 132 such that the UE 132 selects the obtained preamble number.

Although a case where preamble selection by the UE 132 is controlled, configuration may be such that the preambles are divided into groups and the selection of a preamble group by the UE 132 is controlled. Thus, control of the preamble to be selected by the UE 132 can be simplified and the processing load can be reduced.

FIG. 10 is a diagram depicting an example of preamble grouping. As depicted in FIG. 10, 64 preamble numbers (0 to 63) are used. For example, the 64 preamble numbers are assumed to be divided into eight groups of group numbers #0 to #7. For example, the group of group number #0 includes preamble numbers 0 to 7. The UE 132, for example, selects a group number based on Equation (3) and registered C-RNTIs. The group count in Equation (3) is eight in the example depicted in FIG. 10.

$$group\ number=(C\text{-}RNTI*A1+A2)\bmod(group\ count) \quad (3)$$

The UE 132 selects a preamble number from among the preamble numbers included in the group of the group number selected by Equation (3), and transmits to the eNB 131, the preamble that corresponds to the selected preamble number. For this, the eNB 131 first determines the group number that the UE 132 is to be caused to select.

FIG. 11 is a diagram depicting an example of correspondence information for quality information and group numbers. Table 1100 depicted in FIG. 11 is correspondence information for quality information and group numbers. Table 1100, for example, is stored in the memory of the eNB 131. Alternatively, table 1100 may be information received from an external apparatus of the eNB 131.

In table 1100, quality information values Q1 to Qn and respective group numbers G1 to Gn are correlated. The eNB 131 obtains from table 1100, a group number according to the quality information. The eNB 131 assumes that at the UE 132, a group number will be selected according to Equation (3) and thus, selects a C-RNTI so that the UE 132 selects the group number obtained from table 1100. For example, the eNB 131 can calculate the C-RNTI based on the obtained group number and Equation (4), which is obtained by transforming Equation (3).

$$C\text{-}RNTI=\{(group\ count*n+group\ number)-A2\}/A1 \quad (4)$$

Where, n, for example, is a positive integer by which "(group count*n)" does not exceed the C-RNTI value. "n" is stored only by the eNB and is arbitrarily selected by the eNB when the eNB calculates Equation (3). A multiple n, for example, may be used to increment n and further select a different C-RNTI in a case where the C-RNTI (that has been calculated when Equation (2) is calculated from the group number determined by the eNB) has already been assigned to another UE.

By assigning to the UE 132, the C-RNTI calculated by Equation (4), the UE 132 can be caused to select the group number –B determined by the eNB 131. Thus, selection of a group of preambles by the UE 132 can be controlled by the eNB 131.

Thus, in the communications system 100 according to the first embodiment, the mobile communications terminal 110 selects a preamble according to an identifier assigned in the past. Consequently, by selecting at the base station 120, the identifier to be assigned, without additional or new control information, preamble selection by the mobile communications terminal 110 can be controlled.

Thus, the preamble to be selected by the mobile communications terminal 110 is controlled by the base station 120, enabling a reduction in interference occurring in contention based random access. For example, during contention based random access, by assigning different identifiers to the mobile communications terminals 110, the probability that the mobile communications terminals 110 will concurrently select and transmit the same preamble number can be lowered.

Concerning the communications system 100, the mobile communications terminal 110, and the base station 120 according to a second embodiment, portions differing from the communications system 100, the mobile communications terminal 110, and the base station 120 according to the first embodiment will be described.

Figure 12:
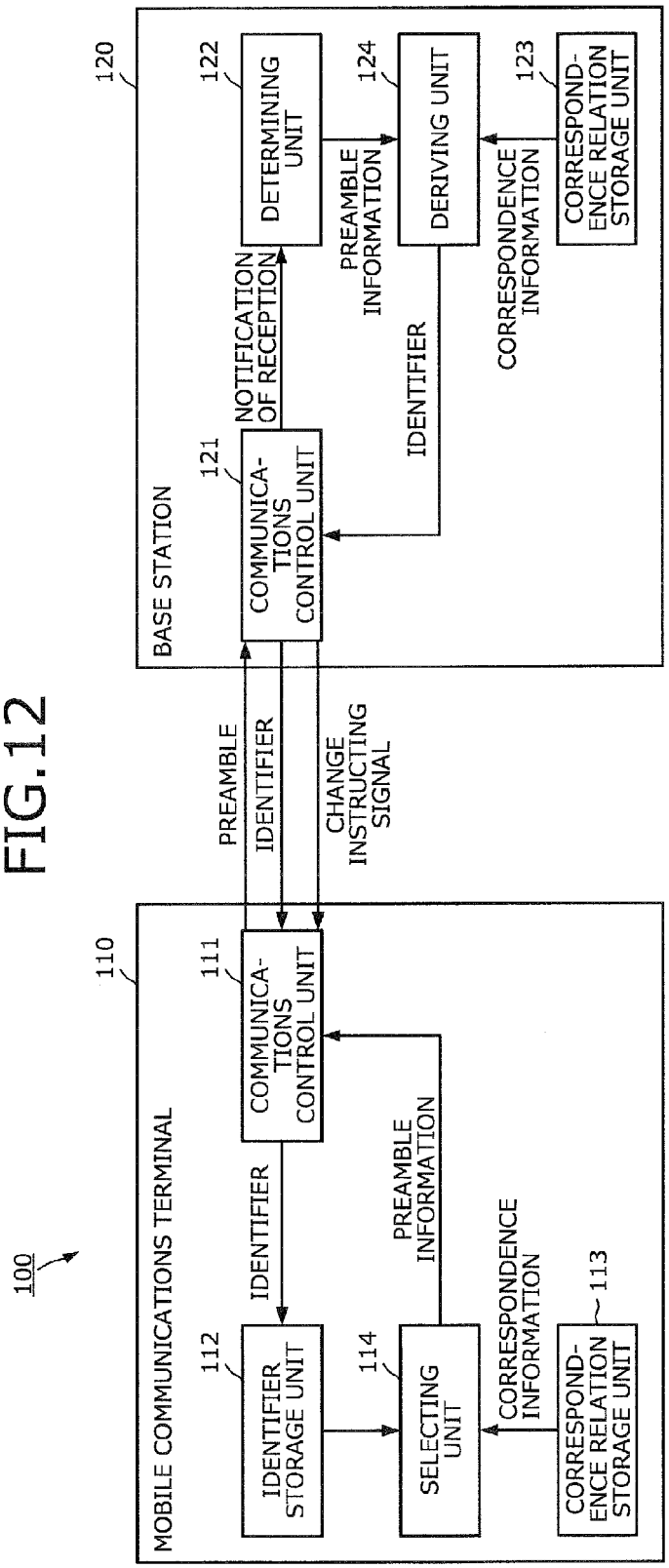
FIG. 12 is a diagram depicting an example of a configuration of the communications system according to a second embodiment.

FIG. 12 is a diagram depicting an example of a configuration of the communications system according to the second embodiment. In FIG. 12, portions identical to those depicted in FIG. 1A are given the same reference numerals used in FIG. 1A and description thereof is omitted. After a RACH procedure for a second or subsequent session with respect to the base station 120 by the mobile communications terminal 110, the communications control unit 121 of the base station 120 transmits to the mobile communications terminal 110, a change instructing signal that instructs the mobile communications terminal 110 to change the assigned identifier. The communications control unit 111 of the mobile communications terminal 110, via radio communication with the base station 120, changes the identifier based on the change instructing signal transmitted from the base station 120.

Based on change instructing signal, the communications control unit 111 changes the identifier stored in the identifier storage unit 11. As a result, the selecting unit 114 selects preamble information that corresponds to the identifier after the change. In the function of changing the identifier of the mobile communications terminal 110, a function of changing the identifier for handover may be used. After receiving the change instructing signal from the base station 120, the communications control unit 111 transmits to the base station 120, a preamble that is based on preamble information that corresponds to the identifier that has been selected by the selecting unit 114 and changed.

Figure 13:
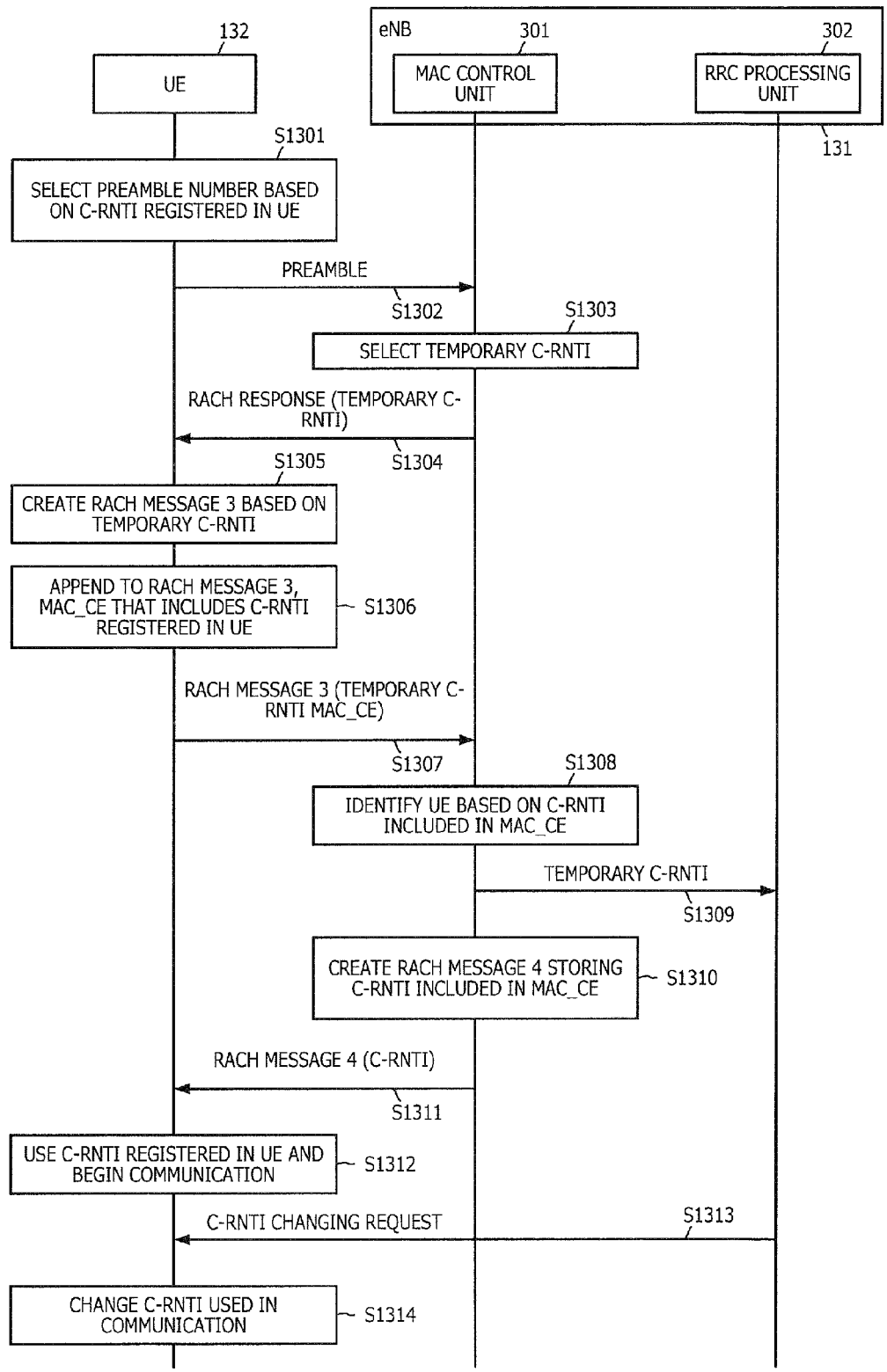
FIG. 13 is a diagram depicting an example of a sequence of the contention based RACH procedure for second and subsequent sessions.

FIG. 13 is a diagram depicting an example of a sequence of the contention based RACH procedure for the second and subsequent sessions. In the communications system 130 according to the second embodiment, the following steps, for example, are performed as the contention based RACH procedure for the second and subsequent sessions by the UE 132 with respect to the eNB 131, when synchronization loss, resumption, handover, etc. occur.

Operations at steps S1301 to S1308 depicted in FIG. 13 are the same as those at steps S401 to S408 depicted in FIG. 4. After step S1308, the MAC control unit 301 notifies the RRC processing unit 302 of the temporary C-RNTI included in the RACH message 3 transmitted at step S1307 (step S1309). Operations at steps S1310 to S1312 depicted in FIG. 13 are the same as those at steps S409 to S411 depicted in FIG. 4.

After step S1312, the RRC processing unit 302 of the eNB 131 transmits to the UE 132, a C-RNTI changing request, which is a signal requesting that the C-RNTI of the UE 132 be changed to the temporary C-RNTI notified at step S1309 (step S1313). The C-RNTI changing request, for example, can be transmitted by a RRC Reconfiguration Request.

According to the C-RNTI changing request transmitted at step S1313, the UE 132 changes the C-RNTI to be used for communication with the eNB 131 (step S1314). Through such steps as described above, the preamble transmitted by the UE 132 can be controlled by the eNB 131, even during random access such as for resumption and requesting synchronization (SyncRequest).

Figure 14:
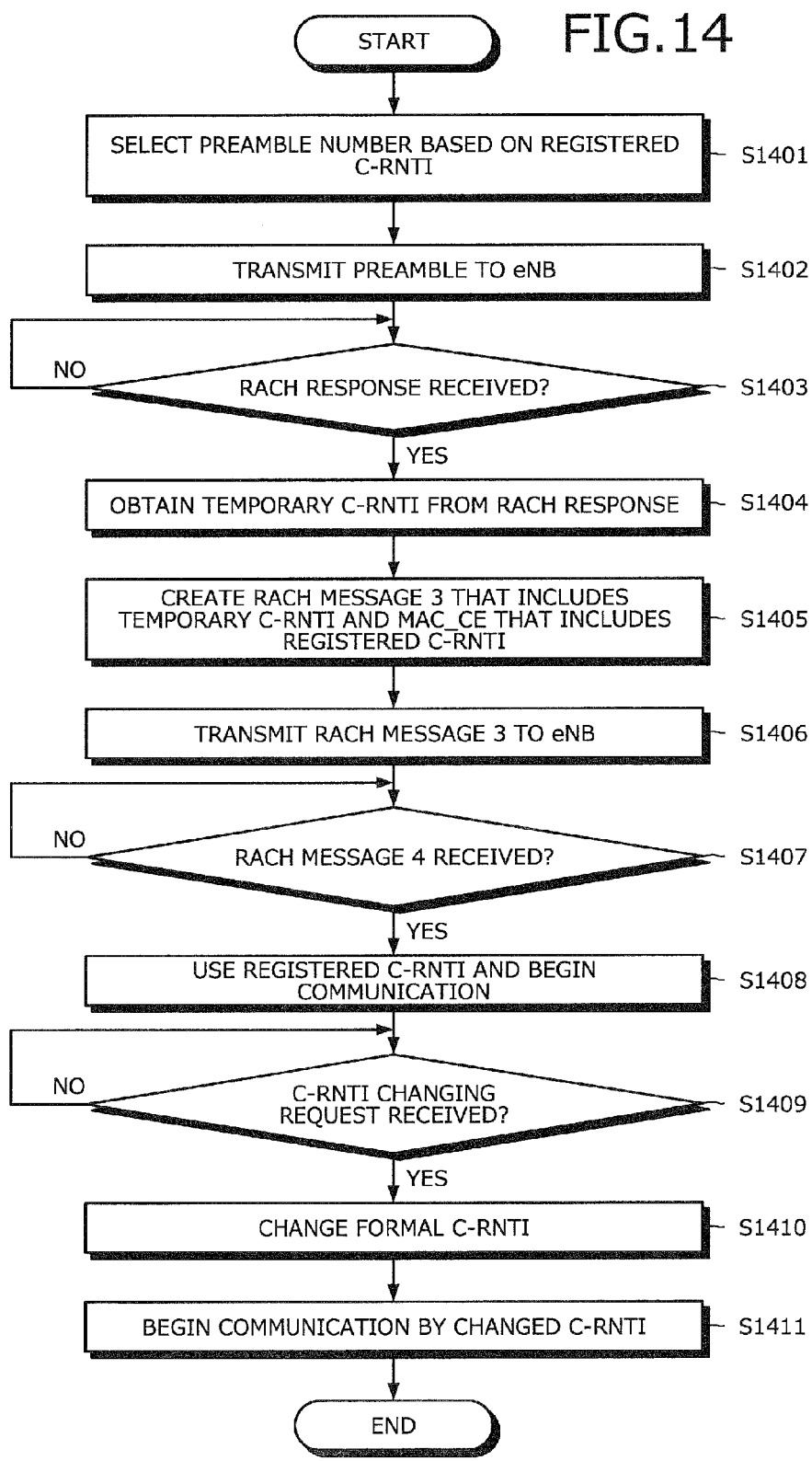
FIG. 14 is a flowchart depicting an example of the RACH procedure for the second and subsequent sessions by the UE.

FIG. 14 is a flowchart depicting an example of the RACH procedure for the second and subsequent sessions by the UE. The UE 132 according to the second embodiment executes, for example, the following steps at step S504 depicted in FIG. 5. Operations at steps S1401 to S1408 depicted in FIG. 14 are identical to those at steps S701 to S708 depicted in FIG. 7.

After step S1408, the UE 132 determines whether a C-RNTI changing request has been received from the eNB 131 (step S1409), and if not, stands by until a C-RNTI changing request is received (step S1409: NO). When a C-RNTI changing request has been received (step S1409: YES), the UE 132 changes the formal C-RNTI, according to the C-RNTI changing request (step S1410). The UE 132 begins communication by the C-RNTI changed at step S1410 (step S1411), and ends the RACH procedure that is for a second or subsequent session.

Figure 15:
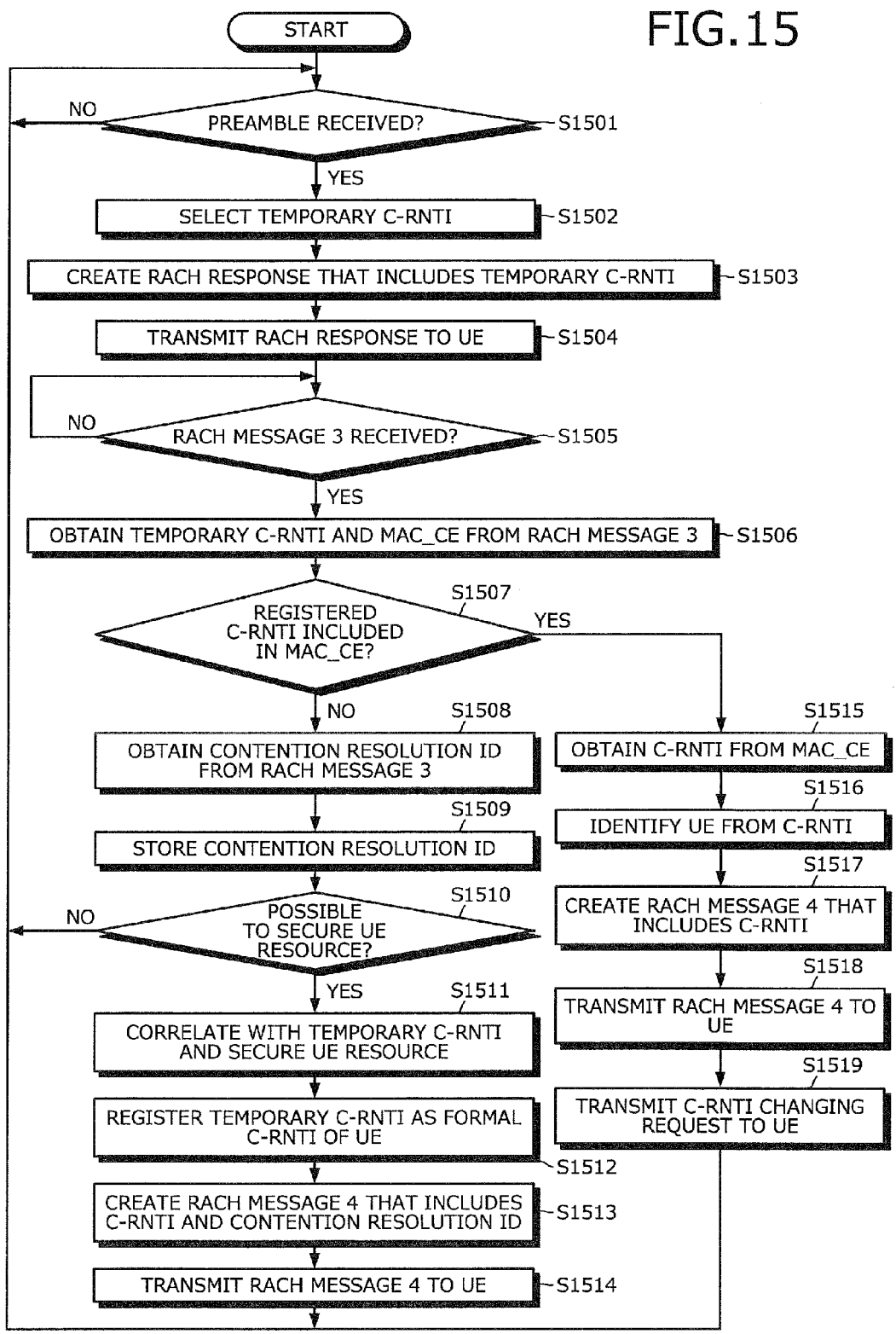
FIG. 15 is a flowchart depicting an example of eNB operation.

FIG. 15 is a flowchart depicting an example of eNB operation. The eNB 131 according to the second embodiment, for example, executes the following steps. Operations at steps S1501 to S1518 depicted in FIG. 1501 are identical to those at steps S801 to S818 depicted in FIG. 8. After step S1518, the eNB 131 transmits to the UE 132, a C-RNTI changing request requesting that the C-RNTI of the UE 132 be changed to the temporary C-RNTI obtained at step S1506 (step S1519), and the eNB 131 returns to step S1501.

Thus, in the communications system 100 according to the second embodiment, when random access occurs while an identifier is assigned to the mobile communications terminal 110, the identifier of the mobile communications terminal 110 can be changed by a change instructing signal from the base station 120. As a result, preamble information selection by the mobile communications terminal 110 can be controlled by the base station 120 even if the identifier of the mobile communications terminal 110 is maintained for a RACH procedure for a second or subsequent session in the case of synchronization loss, resumption, etc.

Concerning the communications system 100, the mobile communications terminal 110, and the base station 120 according to a third embodiment, portions differing from the communications system 100, the mobile communications terminal 110, and the base station 120 according to the second embodiment will be described.

Figure 16:
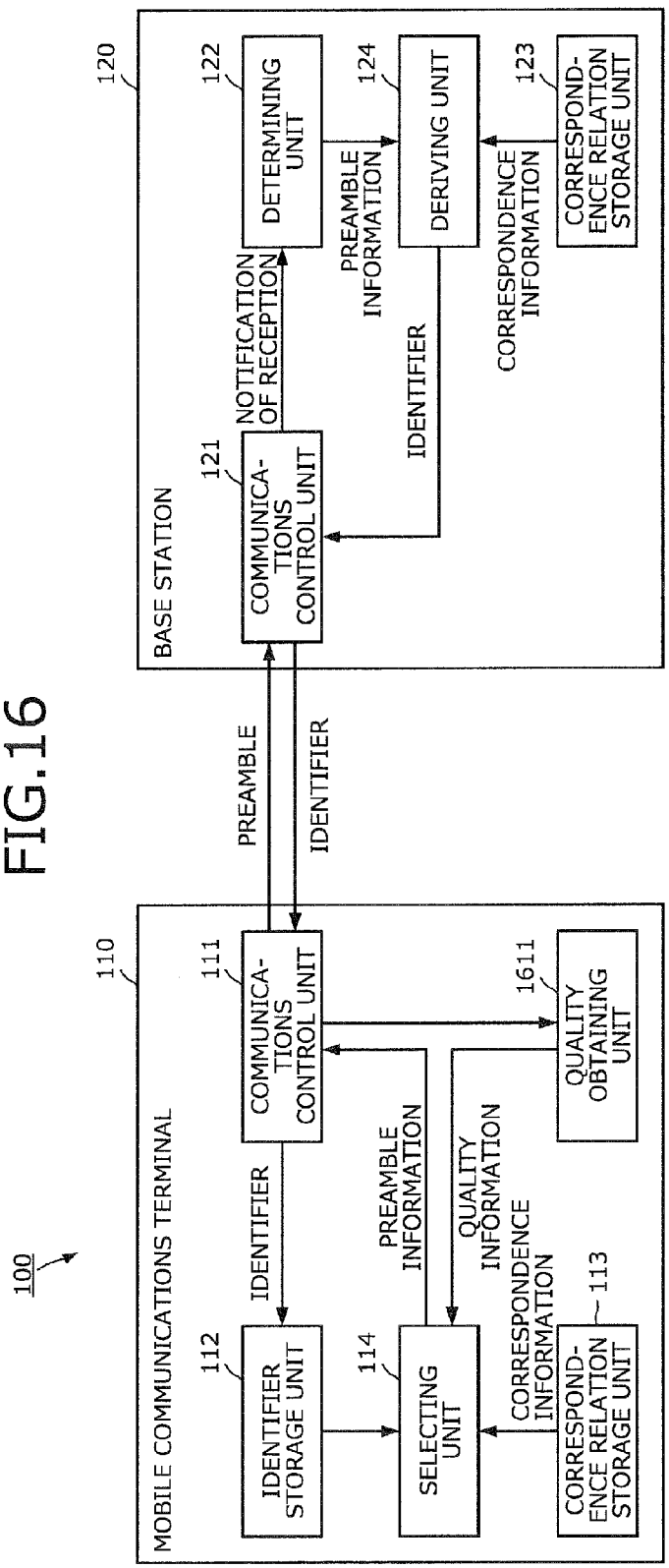
FIG. 16 is a diagram depicting an example of a configuration the communications system according to a third embodiment.

FIG. 16 is a diagram depicting an example of a configuration the communications system according to the third embodiment. In FIG. 16, portions identical to those depicted in FIG. 1A are given the same reference numerals used in FIG. 1A and description thereof is omitted. As depicted in FIG. 16, the mobile communications terminal 110 according to the third embodiment includes a quality obtaining unit 1611 in addition to the configuration depicted in FIG. 1A. The quality obtaining unit 1611, for example, may be implemented by the radio communication interface 215 depicted in FIG. 2A.

The correspondence information stored in the correspondence relations storage units 113, 123 according to the third embodiment is information indicating given correspondence relations among preamble information, identifiers, and quality information, which indicates the propagation quality of communication between the mobile communications terminal 110 and the base station 120.

The correspondence information stored in the correspondence relations storage unit 113 of the mobile communications terminal 110, for example, is a function that can calculate preamble information from a combination of an identifier and quality information. Alternatively, the correspondence information stored in the correspondence relations storage unit 113 may be a table that correlates combinations of identifiers and quality information, and preamble information.

The quality obtaining unit 1611 obtains quality information, which indicates propagation quality of communication between the mobile communications terminal 110 and the base station 120. For example, the quality obtaining unit 1611 obtains the quality information by measuring the propagation quality, based on a signal (e.g., reference signal) transmitted from the base station 120 to the mobile communications terminal 110. Alternatively, the quality obtaining unit 1611 may obtain from the base station 120, via the communications control unit 111, quality information that is measured at the base station 120 and that indicates the propagation quality between the mobile communications terminal 110 and the base station 120. The quality obtaining unit 1611 outputs the obtained quality information to the selecting unit 114.

The selecting unit 114 selects preamble information that satisfies a given correspondence relation among combinations of identifiers stored in the identifier storage unit 112 and quality information output from the quality obtaining unit 1611, the given correspondence relation being indicated by correspondence information stored in the correspondence relations storage unit 113. Thus, when a second or subsequent random access session with respect to the base station 120 is performed, a preamble can be transmitted that is based on preamble information that is based on the identifier assigned by the base station 120 at the previous random access session and the current propagation quality.

The determining unit 122 of the base station 120 determines for each propagation quality, preamble information to be selected by the mobile communications terminal 110. For example, the determining unit 122 determines preamble information for each propagation quality as indicated in table 900 depicted in FIG. 9.

The correspondence information stored in the correspondence relations storage unit 123, for example, is a function that can calculate identifiers from preamble information and quality information. Alternatively, the correspondence information stored in the correspondence relations storage unit 123 may be a table correlating combinations of preamble information quality information with identifiers.

Based on the preamble information for each propagation quality notified by the determining unit 122, the deriving unit 124 derives an identifier that satisfies a given correspondence relation among combinations of identifiers stored in the identifier storage unit 112 and quality information output from the quality obtaining unit 1611, the given correspondence relation being indicated by the correspondence information stored in the correspondence relations storage unit 123. The communications control unit 121 assigns to the mobile communications terminal 110, the identifier derived by the deriving unit 124.

In response, in subsequent random access sessions, the mobile communications terminal 110 selects preamble information that is based on the identifier assigned by the base station 120 and quality information that indicates the propagation quality at the time of random access. As a result, by selection of the identifier derived by the deriving unit 124, the preamble number selected by the mobile communications terminal 110 can be controlled for each propagation quality.

Equation (5) is stored in the UE 132 and is correspondence information indicating a given correspondence relation above. The UE 132, in a RACH procedure for a second or subsequent session, for example, selects a preamble number based on Equation (5) and registered C-RNTIs assigned in the past.

preamble number=adjustment offset+{adjustment
coefficient*(quality information mod $B1$)+C-
RNTI mod $B2$} mod RA preamble count    (5)

The adjustment coefficient is a coefficient for adjusting the relative density of the quality information at the selection of the preamble number and the C-RNTI. In Equation (5), parameter B1 is a parameter for segmenting the quality information. Parameter B2 is a parameter for segmenting the C-RNTI. By changing parameters B1, B2, the interval of preambles to be selected can be varied and the processing load can be adjusted.

The eNB 131 derives a C-RNTI that satisfies Equation (5) for combinations of quality information and preamble information, and assigns the derived C-RNTI to the UE 132. Consequently, the preamble number selected by the UE 132 is uniquely determined by the assigned C-RNTI and the quality information at the time of random access. Therefore, selection of a C-RNTI to be assigned enables the preamble transmitted by the UE 132 to be controlled by the eNB 131.

Furthermore, the preamble transmitted by the UE 132 can be controlled according to the propagation quality at the time of random access, although the propagation quality is unknown when the C-RNTI is assigned.

Further, in the third embodiment, as in the second embodiment, configuration may be such that in a RACH procedure sequence for an access session other than initial access, the C-RNTI of the UE 132 is changed by the eNB 131.

In the third embodiment, configuration may be such that preambles are divided into groups and the selection of a preamble group by the UE 132 is controlled.

As quality information indicating the propagation quality of the radio communication between the eNB 131 and the UE 132, for example, a time alignment (TA) command value may be used. A TA command value is information (transmission timing adjustment information) indicating a difference in operation timing of the UE 132 with respect to the eNB 131. The TA command value is typically larger as the distance of the UE from the eNB 131 increases.

For a UE that is a large distance from the eNB 131, the power of the signal reaching the eNB 131 is low compared to that of a UE that is close to the eNB 131 and therefore, the success rate of the RACH procedure drops. Consequently, the smaller the difference of the operation timing, indicated by the TA command value, the higher the propagation quality is in the radio communication between the eNB 131 and the UE 132.

For example, the eNB 131 can obtain a TA command value by measuring the difference of operation timing of the UE 132 relative to the eNB 121, based on the preamble from the UE 132. The UE 132 can obtain the TA command value by receiving the TA command from the eNB 131.

As quality information indicating the propagation quality in the radio communication between the eNB 131 and the UE 132, a path loss value indicating the magnitude of path loss may be used. Path loss, typically, increase the farther away the UE is from the eNB 131. Further, path loss also increases when the signal is attenuated by an object between the eNB 131 and the UE 132. Therefore, the lower the path loss indicated by the path loss value, the higher the propagation quality is in the radio communication between the eNB 131 and the UE 132.

Path loss, for example, can be measured at the UE 132, based on a signal (e.g., reference signal) transmitted from the eNB 131. The eNB 131, for example, can obtain the path loss value, which indicates the magnitude of the path loss measured at the UE 132, by receiving the path loss value from the UE 132.

As the quality information indicating the propagation quality of the radio communication between the eNB 131 and the UE 132, an interference power value of the DL (downlink) signal may be used. For a UE having a high interference power value, the actual signal is easily buried by the interference power and does not propagate well. Therefore, the lower the interference power value, the higher the propagation quality is in the radio communication between the eNB 131 and the UE 132.

The interference power value of DL signal, for example, can be measured at the UE 132, based on a signal (e.g., reference signal) transmitted from the eNB 131. The eNB 131, for example, can obtain the interference power value of DL signal measured at the UE 132, by receiving a measurement report from the UE 132.

As the quality information indicating the propagation quality of the radio communication between the eNB 131 and the UE 132, both the TA command value and the path loss value may be used. The UE 132, for example, can calculate the quality information indicating the propagation quality of the radio communication between the eNB 131 and the UE 132 (UE power matrix), by Equation (6).

$$\text{UE power matrix} = (\text{TA command value}/\text{maximum TA command value}) \times \alpha + (\text{path loss value}/\text{maximum path loss value}) \times \beta \quad (6)$$

In Equation (6), α and β are parameters for determining whether to apply relative density to the TA command value or the path loss value. By respectively dividing the TA command value and the path loss value by the maximum values, the TA command value and the path loss value can be normalized, enabling an assessment value within a range of 0 to 1 to be set. The smaller the value of the UE power matrix calculated by Equation (6), the higher the propagation quality is in the radio communication between the eNB 131 and the UE 132. Thus, quality information may be calculated based on both the TA command value and the path loss value.

As the quality information indicating the propagation quality of the radio communication between the eNB 131 and the UE 132, both the TA command value and the interference power value of DL signal may be used. The UE 132, for example, calculates the quality information indicating the propagation quality of the radio communication between the eNB 131 and the UE 132 (UE power matrix), by Equation (7).

$$\text{UE power matrix} = (\text{TA command value}/\text{maximum TA command value}) \times \alpha + (\text{interference power value of DL signal}/\text{maximum interference power value of DL signal}) \times \beta \quad (7)$$

In Equation (7), α and β are parameters for determining whether to apply relative density to the TA command value or the interference power value of DL signal. By respectively dividing the TA command value and the interference power value of DL signal by the maximum values, the TA command value and the interference power value of DL signal can be normalized, enabling an assessment value within a range of 0 to 1 to be set. The smaller the value of the UE power matrix calculated by Equation (7), the higher the propagation quality is in the radio communication between the eNB 131 and the UE 132. Thus, the quality information may be calculated based on both the TA command value and the interference power value of DL signal.

As the quality information indicating the propagation quality of the radio communication between the eNB 131 and the UE 132, the TA command value, the interference power value of DL signal, and the path loss value may be used. The UE 132, for example, calculates the quality information indicating the propagation quality of the radio communication between the eNB 131 and the UE 132 (UE power matrix), by Equation (8).

$$\text{UE power matrix} = (\text{TA command value}/\text{maximum TA command value}) \times \alpha + (\text{interference power value of DL signal}/\text{maximum interference power of DL signal}) \times \beta + (\text{path loss value}/\text{maximum path loss value}) \times \gamma \quad (8)$$

In Equation (8), α, β, and γ are parameters for determining weights for the TA command value, the interference power value of DL signal, and the path loss value, respectively. By respectively dividing the TA command value, the interference power value of DL signal, and the path loss value by the maximum values, the TA command value, the interference power value of DL signal, and the path loss value can be normalized, enabling an assessment value within in a range of 0 to 1 to be set. The smaller the value of the UE power matrix calculated by Equation (8), the higher the propagation quality is in the radio communication between the eNB 131 and the UE 132. Thus, the quality information may be calculated based on the TA command value, the interference power value of DL signal, and the path loss value.

As the quality information indicating the propagation quality of the radio communication between the eNB 131 and the UE 132, UE Power Headroom (UPH), which indicates the ratio of the current transmission power relative to the maximum transmission power of the UE 132, may be used.

The UPH indicates the available transmission power of the UE 132 and is a value defined under 3GPP standards. When the value of UPH is large, relative to the maximum transmission power of the UE 132, the actual power transmitted by the UE 132 is low. In other words, the UPH is a value indicating available power for enhancing the power.

In the communications system 130, for example, a UL-TPC function to control the transmission power of the UE 132 by an instruction (TPC Command) from the eNB 131 may be used such that the Signal to Interference and Noise Ratio (SINR) from the UE 132 to the eNB 131 becomes a desired value.

By the UL-TPC function, a UE with poor quality performs control to raise the transmission power to maintain a constant SINR, while a UE with good quality performs control to lower the transmission power to prevent wasteful power consumption for transmission. Therefore, a large UPH indicates that the transmission power is low and that a given quality can be achieved without raising the transmission power of the UE 132.

Therefore, the higher the UPH, the higher the propagation quality is in the radio communication between the eNB 131 and the UE 132. The eNB 131, for example, can obtain the UPH obtained at the UE 132, by receiving the UPH from the UE 132.

Here, determination of the preamble information by the eNB 131 when the TA command value is used as the quality information will be described.

For example, the eNB 131 calculates the TA command value based on the preamble received from the UE 132 and transmits the calculated TA command value to the UE 132 by storing the TA command value in the RACH response transmitted to the UE 132. The UE 132 can obtain the TA command value from the RACH response received from the eNB 131.

The eNB 131 (the determining unit 122) determines preamble information for each TA command value, such that the preamble information differs according to TA command value. As a result, preamble information selected by a UE that is a relatively long distance from the eNB 131 and the preamble information selected by a UE that is a relatively short distance from the eNB 131 can be made to differ.

Thus, the probability that UEs a similar distance from the eNB 131 will select the same preamble information increases and the probability that UEs not a similar distance from the eNB 131 will select the same preamble information decreases. Therefore, the probability that interference will occur during random access by UEs not a similar distance from the eNB 131 decreases, enabling the success rate of the RACH procedure for each distance from the eNB 131 to be equalized.

Although a case where the TA command value is used as the quality information has been described, the same is true in a case where the path loss value, the interference power value of DL signal, the UPH quality information, or any combination thereof is used. Thus, by determining the preamble information to be selected by the UE 132 for each propagation quality to differ according to propagation quality, the success rate of the RACH procedure can be equalized.

An example of improving success rate of RACH procedure for a specific UE will be described. The eNB 131 may store to the memory of the eNB 131 and store according to preamble information, the average of TA command values calculated based on preambles received in the past. The eNB 131 determines the preamble information for each TA command value such that the lower the TA command value is, the higher the average of past TA command values is for the preamble information.

As result, the closer a UE (UE with favorable quality) is to the eNB 131, preamble information for which the average of past TA command values is high can be selected. Therefore, a UE that is close to the eNB 131 selects preamble information that is likely to be used by a UE that is far from the eNB 131, thereby improving the success rate of the RACH procedure according to differences in distance.

Therefore, the success rate of the RACH procedure of a UE close to the eNB 131 is improved, enabling improved throughput. Further, by improving the success rate of the RACH procedure of a UE that is close to the eNB 131, the number of UEs performing random access with respect to the eNB 131 decreases, whereby the success rate for the RACH procedures of UEs far from the eNB 131 is improved, thereby enabling throughput to be improved.

Although a case where the TA command value is used as the quality information, the same is true for cases where the path loss value, the interference power value of DL signal, the UPH quality information, or any combination thereof is used. Thus, the eNB 131 averages and stores according to preamble information, the obtained quality information; and determines the preamble information to be selected by the UE 132 for each propagation quality such that the higher the obtained propagation quality is, the lower the average propagation quality is for the preamble information. Thus, the success rate of the RACH procedures for a UE having a high propagation quality and a UE having a low propagation quality are equalized, enabling throughput to be improved.

Thus, in the communications system 100 according to the third embodiment, the mobile communications terminal 110 selects preamble information that corresponds to a combination of the propagation quality and the identifier assigned by the base station 120. The base station 120 determines for each propagation quality, the preamble information to be selected by the mobile communications terminal 110; derives an identifier that satisfies a given correspondence relation among combinations of the determined propagation quality and preamble information; and assigns the derived identifier to the mobile communications terminal 110. Thus, a preamble that is based on preamble information corresponding to the identifier assigned by the base station 120 and the current propagation quality can be transmitted from the mobile communications terminal 110.

Concerning the communications system 100, the mobile communications terminal 110, and the base station 120 according to a fourth embodiment, portions differing from those of the communications system 100, the mobile communications terminal 110, and the base station 120 according to the third embodiment will be described.

Figure 17:
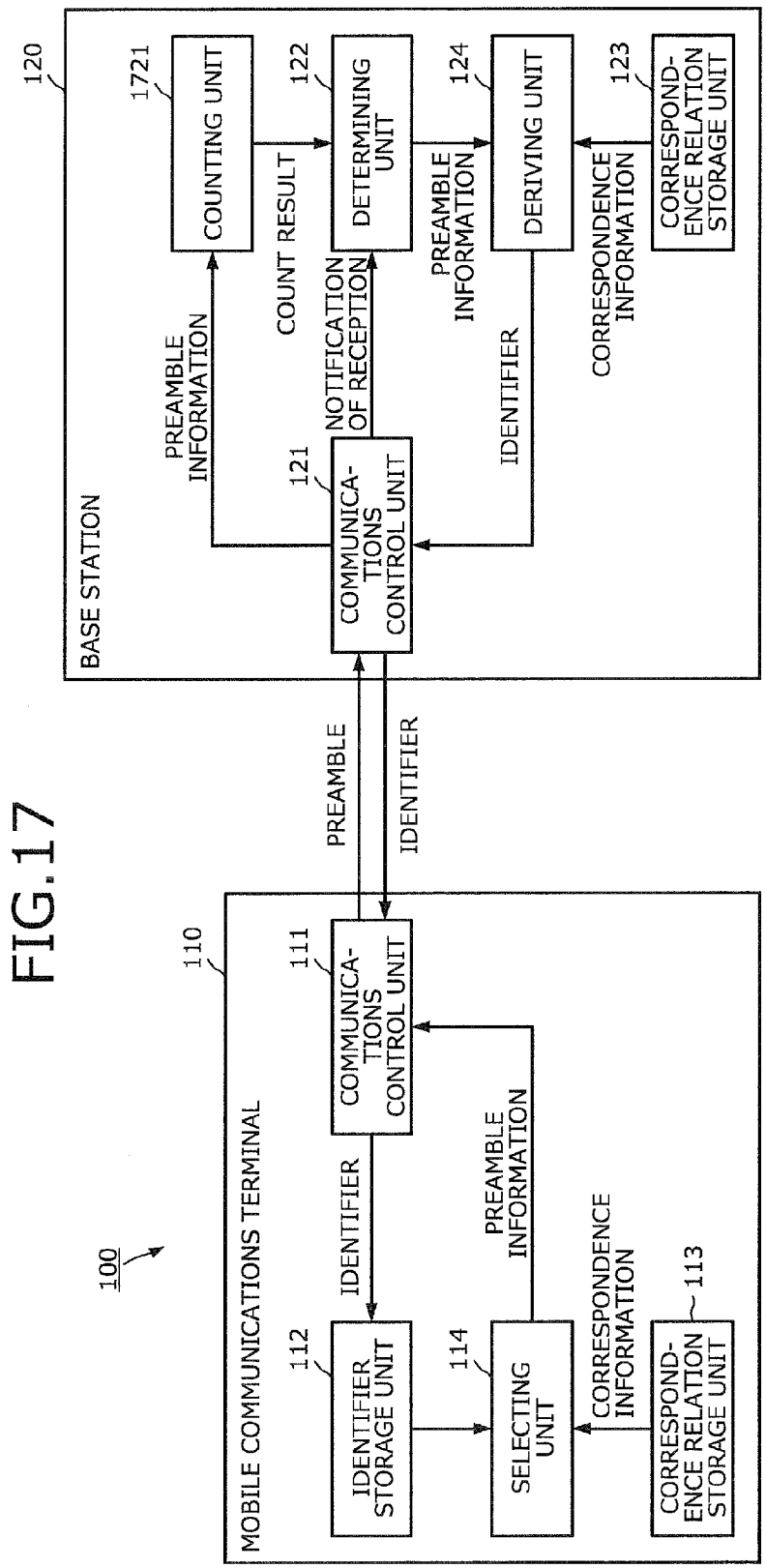
FIG. 17 is a diagram depicting an example of a configuration of the communications system according to the fourth embodiment.

FIG. 17 is a diagram depicting an example of a configuration of the communications system according to the fourth embodiment. In FIG. 17, portions identical to those depicted in FIG. 1A are given the same reference numerals used in FIG. 1A and description thereof is omitted. As depicted in FIG. 17, the base station 120 according to the fourth embodiment includes a counting unit 1721 in addition to the configuration depicted in FIG. 1A. The counting unit 1721, for example, may be implemented by the CPU 221 and, the main memory 222 or the auxiliary memory 223 depicted in FIG. 2B.

The communications control unit 121 notifies the counting unit 1721 of the preamble information (e.g., preamble number) of the received preamble. Based on the notifications of the base station receptions from the communications control unit 121, the counting unit 1721 counts according to the preamble information, the number of preambles that the base station 120 has received. Further, the counting unit 1721 may initialize (e.g., zero) the count result at fixed intervals. The counting unit 1721 notifies the determining unit 122 of the count result.

Based on the count result notified by the counting unit 1721, the determining unit 122 determines from among the preamble information, preamble information for which the reception count is lower than other preamble information to be the preamble information to be selected by the mobile communications terminal 110. Thus, preamble information of a low utilization rate in the coverage area 131$a$ of the eNB 131 can be caused to be selected by the mobile communications terminal 110.

As a result, a preamble number not frequently used in past RACH procedures can be assigned to the mobile communications terminal 110. Therefore, the mobile communications terminal 110 in performing subsequent RACH procedures has a lower risk of a collision occurring with another mobile communications terminal.

FIG. 18 is a diagram depicting another example of a configuration of the communications system according to the fourth embodiment. In FIG. 18, portions identical to those depicted in FIG. 16 or FIG. 17 are given the same reference numerals used in FIGS. 16 and 17, and description thereof is omitted. As depicted in FIG. 18, the mobile communications terminal 110 according to the fourth embodiment may include the quality obtaining unit 1611 depicted in FIG. 16, in addition to the configuration depicted in FIG. 17.

In the mobile communications terminal 110 according to the fourth embodiment, the selecting unit 114 is identical to the selecting unit 114 according to the third embodiment. In other words, the quality obtaining unit 1611 obtains the quality information, which indicates propagation quality of communication between the mobile communications terminal 110 and the base station 120. The selecting unit 114 selects preamble information that satisfies a given correspondence relation in a combination of an identifier stored in the identifier storage unit 112 and the quality information obtained by the quality obtaining unit, the given correspondence being indicated by correspondence information stored in the correspondence relations storage unit 113.

The determining unit 122 of the base station 120, for example, sets preamble information for each propagation quality such that the lower the propagation quality indicated by the quality information, the fewer receptions (interference resistant) of the preamble information. Thus, the success rate of the RACH procedure of a UE having poor propagation quality can be increased, enabling the success rate of the RACH procedure to be increased on average.

Further, the determining unit 122 of the base station 120 may set preamble information for each propagation quality such that the higher the propagation quality indicated by the quality information, the fewer receptions (interference resistant) of the preamble information. Thus, the success rate of the RACH procedure of a UE having favorable propagation quality can be increased, enabling throughput to be improved.

Thus, in the communications system 100 according to the fourth embodiment, the base station 120 counts according to preamble information, the number of times a preamble is received from the mobile communications terminals, and based on the count result, determines the preamble information to be selected by the mobile communications terminal 110. Thus, the preamble to be transmitted by the mobile communications terminal 110 can be controlled according to the frequency of utilization in random access with respect to the base station 120.

As described, the communications system, the communications method, the mobile communications terminal, and the base station enable interference occurring in random access to be reduced.

In other words, in a conventional contention-based random access procedure, the RACH procedure is performed without consideration of the circumstances of the UE (propagation environment, speed of movement, distance, etc.) and consequently, in the detection of the preamble on the eNB side, a significant amount of interference occurs. Further, a UE in an unfavorable environment is in a situation in which success of the RACH procedure is often difficult. These circumstances are consequent to the preamble transmitted in the contention based RACH procedure being randomly selected.

In contrast, in the communications system 100, for example, a simple preamble selection scheme of adding a C-RNTI is added on the UE side and the number of the C-RNTI assigned by the eNB is controlled. As a result, even without the addition of special control information, the preamble to be selected by the UE is controlled on the eNB, reducing interference and improving the success rate of the RACH procedure, enabling equalization of the success rate of the RACH procedure for each UE.

For example, compared to a scheme where a preamble is selected only by quality information on the UE side, the propagation quality measured on the eNB side when the preamble is received, the utilization rate of each preamble number, etc. can be reflected in the preamble selection by the UE.

According to one aspect of the present invention, reductions in interference occurring with random access can be facilitated.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communications system comprising:
a base station; and
a mobile communications terminal, wherein
the base station and the mobile communications terminal execute a random access procedure, and perform radio communication,
the base station is configured to assign to the mobile communications terminal, in the random access procedure, an identifier that corresponds to preamble information, the base station assigning the identifier based on first correspondence information that indicates a given correspondence relation of the preamble information to be transmitted by the mobile communications terminal and the identifier assigned to mobile communications terminal,
the mobile communications terminal is configured to execute the random access procedure with the base station by transmitting to the base station, the preamble information that corresponds to the identifier assigned by the base station,
the mobile communications terminal transmits based on second correspondence information that indicates the given correspondence relation, the preamble information that corresponds to the identifier assigned by the base station,
the first correspondence information and the second correspondence information indicate a given correspondence relation of propagation quality of the radio communication between mobile communications terminal and the base station, the identifier, and the preamble information,
the mobile communications terminal selects the preamble information that corresponds to a combination of the identifier assigned by the base station and the propagation quality, and
the base station determines for each propagation quality, the preamble information that the mobile communications terminal is to be caused to select, derives an identifier satisfying the given correspondence relation in each determined combination of a propagation quality and preamble information, and assigns the derived identifier to the mobile communications terminal.

2. The communications system according to claim 1, wherein
the base station transmits to the mobile communications terminal, a change instructing signal that instructs the mobile communications terminal to change the assigned identifier, the base station transmitting the change instructing signal when the mobile communications terminal performs the random access procedure in a state where the identifier is assigned to the mobile communications terminal, and
the mobile communications terminal changes based on the change instructing signal transmitted by the base station, the identifier used in the radio communication with the base station and transmits to the base station, a preamble that is based on preamble information that corresponds to the identifier post-change to thereby perform the random access procedure with the base station.

3. The communications system according to claim 1, wherein
the base station determines the preamble information that the mobile communications terminal is to be caused to select, the base station determining the preamble information, based on propagation quality of the radio communication between the mobile communications terminal and the base station.

4. The communications system according to claim 1, wherein the base station determines the preamble information that the mobile communications terminal is to be caused to select for each propagation quality such that the preamble information differs according to the propagation quality.

5. The communications system according to claim 1, wherein the base station stores according to preamble information indicating preambles received, an average value of the propagation quality measured based on the preamble received, and determines the preamble information that the mobile communications terminal is to be caused to select for each propagation quality such that the higher the propagation quality, the lower the average value is for the preamble information.

6. The communications system according claim 1, wherein the propagation quality is a propagation quality based on a difference of operation timing of the mobile communications terminal with respect to the base station.

7. The communications system according to claim 1, wherein the propagation quality is a propagation quality based on path loss of a signal transmitted from the base station to the mobile communications terminal.

8. The communications system according to claim 1, wherein the propagation quality is a propagation quality based on interference power of a signal transmitted from the base station to the mobile communications terminal.

9. The communications system according to claim 1, wherein
the preamble information is information indicating candidates for the preamble of the random access procedure, and
the mobile communications terminal transmits a preamble among the candidates indicated by the preamble information.

10. A communications method of a communications system in which a base station and a mobile communications terminal execute a random access procedure, and the base station and the mobile communications terminal perform radio communication, the communications method comprising:
assigning to the mobile communications terminal, by the base station, an identifier that corresponds to preamble information, the base station assigning the identifier based on first correspondence information that indicates a given correspondence relation of the preamble information to be transmitted by the mobile communications terminal and the identifier assigned to mobile communications terminal; and
executing, by the mobile communications terminal, the random access procedure with the base station by transmitting to the base station, the preamble information that corresponds to the identifier assigned by the base station, wherein
the mobile communications terminal transmits based on second correspondence information that indicates the given correspondence relation, the preamble information that corresponds to the identifier assigned by the base station,
the first correspondence information and the second correspondence information indicate a given correspondence relation of propagation quality of the radio communication between mobile communications terminal and the base station, the identifier, and the preamble information,
the mobile communications terminal selects the preamble information that corresponds to a combination of the identifier assigned by the base station and the propagation quality,
the base station determines for each propagation quality, the preamble information that the mobile communications terminal is to be caused to select, derives an identifier satisfying the given correspondence relation in each determined combination of a propagation quality and preamble information, and assigns the derived identifier to the mobile communications terminal.

11. A base station that executes a random access procedure with a mobile communications terminal and performs radio communication with the mobile communications terminal, wherein
the base station is configured to assign to the mobile communications terminal, in the random access procedure, an identifier that corresponds to preamble information, the base station assigning the identifier based on first correspondence information that indicates a given correspondence relation of the preamble information to be transmitted by the mobile communications terminal and the identifier assigned to the mobile communications terminal, and the base station performing the random access procedure with the mobile communications terminal that transmitted the preamble information that corresponds to the identifier assigned to the mobile communications terminal,
the mobile communications terminal transmits based on second correspondence information that indicates the given correspondence relation, the preamble information that corresponds to the identifier assigned by the base station,
the first correspondence information and the second correspondence information indicate a given correspondence relation of propagation quality of the radio communication between mobile communications terminal and the base station, the identifier, and the preamble information,
the mobile communications terminal selects the preamble information that corresponds to a combination of the identifier assigned by the base station and the propagation quality, and
the base station determines for each propagation quality, the preamble information that the mobile communications terminal is to be caused to select, derives an identifier satisfying the given correspondence relation in each determined combination of a propagation quality and preamble information, and assigns the derived identifier to the mobile communications terminal.

* * * * *